United States Patent
Ezra et al.

(10) Patent No.: US 10,728,101 B2
(45) Date of Patent: *Jul. 28, 2020

(54) IN-VEHICLE NETWORK ANOMALY DETECTION

(71) Applicant: Argus Cyber Security Ltd., Tel Aviv (IL)

(72) Inventors: Shiran Ezra, Ramat Gan (IL); Or Dagmi, Rehovot (IL); Gilad Barzilay, Ganey Tikva (IL); Yaron Galula, Kadima (IL)

(73) Assignee: Argus Cyber Security Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,294

(22) Filed: May 1, 2018

(65) Prior Publication Data
US 2018/0248766 A1    Aug. 30, 2018

Related U.S. Application Data

(63) Continuation-in-part of application No. 15/582,844, filed on May 1, 2017.
(Continued)

(51) Int. Cl.
| | |
|---|---|
| *G06F 21/00* | (2013.01) |
| *H04L 12/24* | (2006.01) |
| *H04L 12/40* | (2006.01) |
| *H04L 29/08* | (2006.01) |
| *H04W 4/48* | (2018.01) |

(52) U.S. Cl.
CPC ............. *H04L 41/12* (2013.01); *H04L 12/40* (2013.01); *H04L 12/40013* (2013.01); *H04L 67/12* (2013.01); *H04W 4/48* (2018.02); *H04L 2012/40215* (2013.01)

(58) Field of Classification Search
CPC ........... H04L 67/12; H04L 2012/40215; H04L 63/1416; H04L 63/1425; H04L 2012/40273
See application file for complete search history.

(56) References Cited

U.S. PATENT DOCUMENTS

| | | |
|---|---|---|
| 9,491,197 B2 | 11/2016 | Adachi |
| 2015/0191136 A1 | 7/2015 | Ben Noon et al. |

(Continued)

FOREIGN PATENT DOCUMENTS

WO    2018104929    6/2018

OTHER PUBLICATIONS

Jared Combs, Secure Ethernet Communication for Autonomous Driving, Elekrobit, Jun. 2016, pp. 1-24.

(Continued)

*Primary Examiner* — Ghazal B Shehni
(74) *Attorney, Agent, or Firm* — A.C. Entis-IP Ltd.; Allan C. Entis

(57) ABSTRACT

A method of identifying a node of a plurality of nodes in an in-vehicle communications network that transmitted a waveform propagating in the network, comprising comparing a fingerprint generated for the propagating voltage waveform with a library having library fingerprints that are unique for waveforms transmitted by each node to determine which node transmitted the waveform.

7 Claims, 11 Drawing Sheets

Related U.S. Application Data

(60) Provisional application No. 62/330,176, filed on May 1, 2016.

(56) References Cited

U.S. PATENT DOCUMENTS

| | | | |
|---|---|---|---|
| 2015/0349810 A1* | 12/2015 | Baxley | H04W 12/08 455/500 |
| 2015/0372996 A1 | 12/2015 | Schrum, Jr. et al. | |
| 2016/0098561 A1 | 4/2016 | Keller et al. | |
| 2016/0205117 A1 | 7/2016 | Laifenfeld et al. | |
| 2017/0318044 A1 | 11/2017 | Dagmi et al. | |

OTHER PUBLICATIONS

Circuit Protection Considerations for Automotive Information Busses, Raychem Circuit Protection Products, Tyco Electronics, 2009, pp. 1-6.

Requirements on Module Secure Onboard Communication, Autosar Release 4.2.2, Jul. 31, 2015, pp. 1-16, https://www.autosar.org/standards/classic-platform/release-42/; https://www.autosar.org/fileadmin/files/standards/classic/4-2/AUTOSAR_TR_ReleaseOverviewAndRevHistory.pdf.

Specification of Module Secure Onboard Communication, AUTOSAR Release 4.2.2, Jul. 31, 2015, pp. 1-102, https://www.autosar.org/standards/classic-plafform/release-42/; https://www.autosar.org/fileadmin/files/standards/classic/4-2/AUTOSAR_TR_ReleaseOverviewAndRevHistory.pdf.

Dr.-Ing. Olaf Henniger et al., Securing Vehicular On-Board IT Systems, 2009, pp. 1-14, https://www.evita-project.org/publications.html.

Dehai Zhang et al., A PCA-based Face Recognition Method by Applying Fast Fourier Transform in Pre-processing, 3rd International Conference on Multimedia Technology (ICMT 2013), pp. 1155-1162.

International Search Report and Written Opinion dated Aug. 9, 2017 for PCT Application No. PCT/IL2017/050485, filed May 1, 2017.

Douglas F. Elliott (edited by), Handbook of Digital Signal Processing Engineering Applications, Academic Press, Inc., San Diego California; 1987, Chapter 1, pp. 6-9, 24-26 (Copyright Elsevier BV XP040425219 for Exclusive use by European Patent Office Sites Only).

Writen Opinion of the Preliminary Examination Authority dated Apr. 3, 2018 for International Application No. PCT/IL2017/050485 filed May 1, 2017.

International Preliminary Report on Patentability dated Jul. 26, 2018 for International Application No. PCT/IL2017/050485 filed May 1, 2017.

U.S. Office Action dated Nov. 1, 2018 for U.S. Appl. No. 15/582,844, filed May 1, 2017.

European Search Report dated Sep. 30, 2019 for Application No. 19171850.1 filed Apr. 30, 2019.

Choi Wonsuk et al., Identifying ECUs Using Inimitable Characteristics of Signals in Controller Area Networks, ARXIV.ORG, Cornell University Library, 2OT Olin Library Cornell University Ithaca, NY 14853, Jul. 2, 2016, pp. 1-12.

Zhaohua Wu et al., On the trend, detrending, and variability of nonlinear and nonstationary time series, Proceedings of the National Academy of Sciences (PNAS), vol. 104, No. 38, Sep. 18, 2007 (Sep. 18, 2007), pp. 14889-14894.

Final Office Action dated May 9, 2019 for U.S. Appl. No. 15/582,844, filed May 1, 2017.

U.S. Office Action dated Dec. 10, 2019 for U.S. Appl. No. 15/582,844, filed May 1, 2017.

European Office Action dated Mar. 10, 2020 for Application No. 17729928.6 filed Oct. 31, 2018.

* cited by examiner

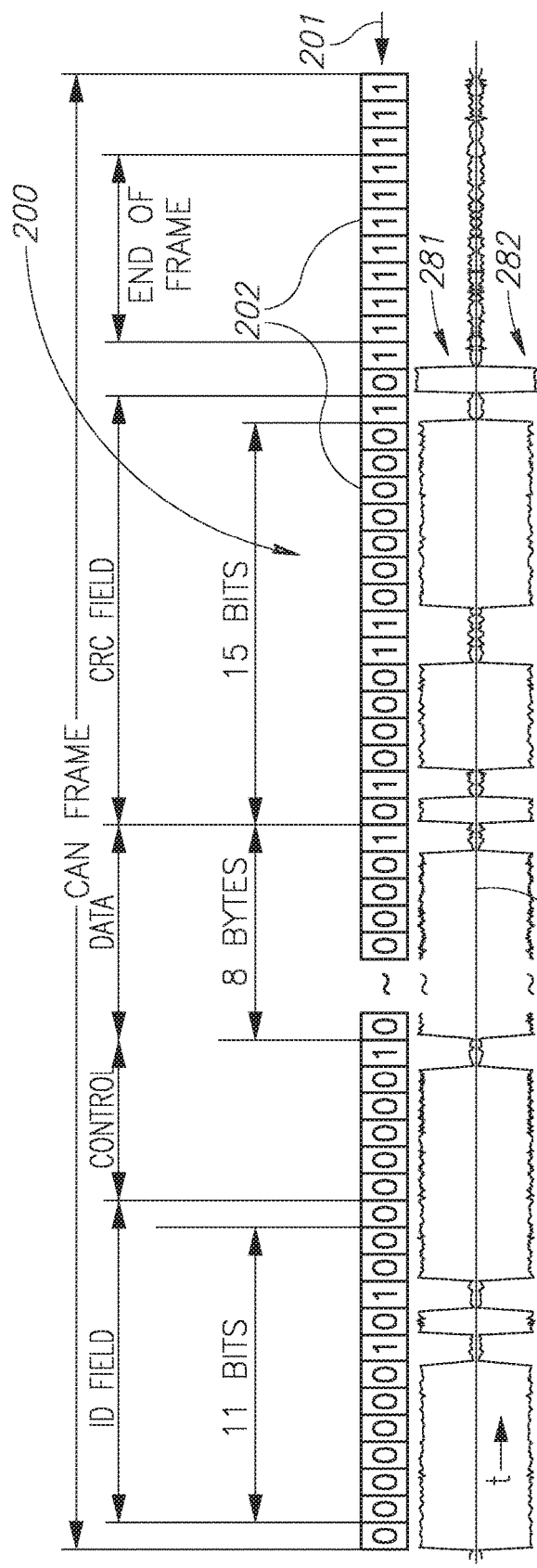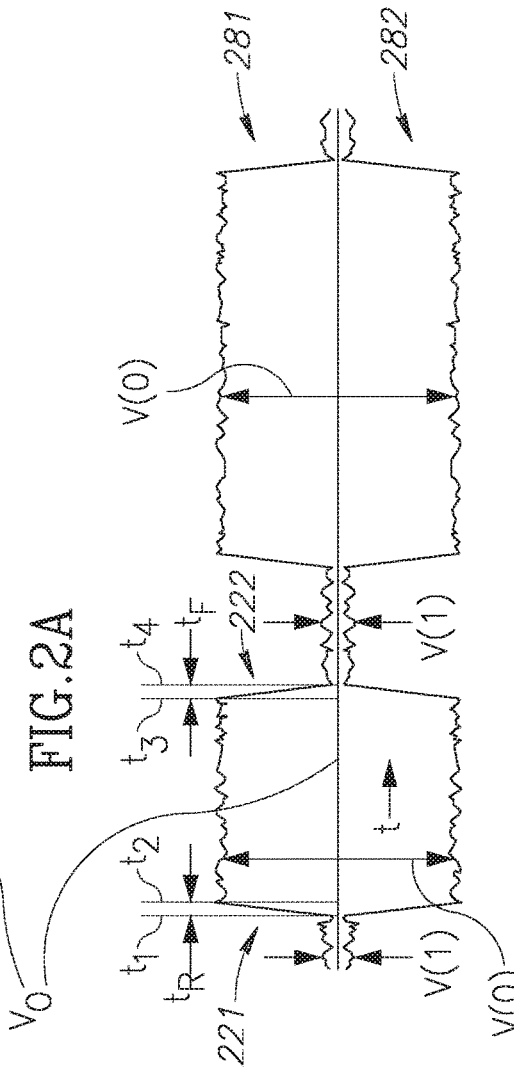
FIG.2A
FIG.2B

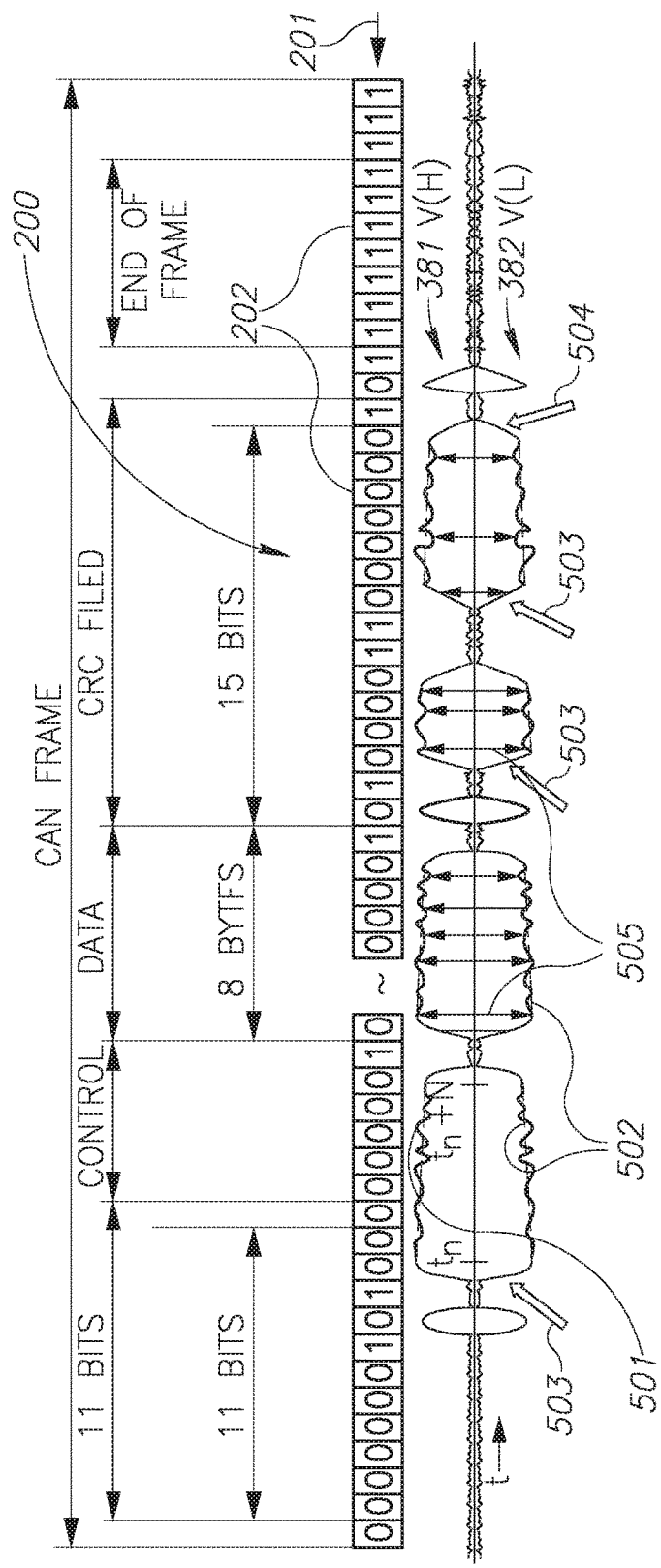
FIG.4A
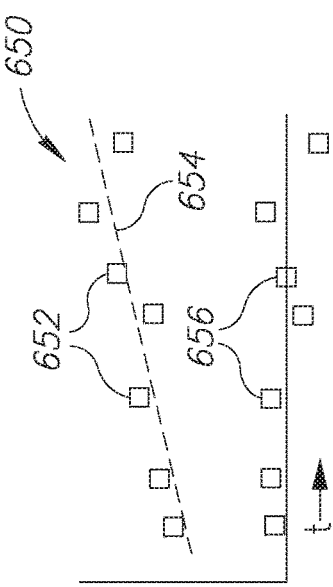
FIG.4C
FIG.4B

IN-VEHICLE NETWORK ANOMALY DETECTION

RELATED APPLICATIONS

The present application is a continuation in part application of U.S. patent application Ser. No. 15/582,844 filed on May 1, 2017, which claims benefit under 35 U.S.C. 119(e) of U.S. Provisional Application 62/330,176 filed May 1, 2016, the disclosures of which are incorporated herein by reference.

FIELD

Embodiments of the disclosure relate to identifying sources of signals propagating in an in-vehicle communication network over which components of a vehicle communicate.

BACKGROUND

Modern vehicles, whether aircraft, sea craft, or automotive, are typically "drive by wire" (DbW) vehicles in which electrical and/or electromechanical components exchange digital signals over a wired and/or wireless in-vehicle communication network to cooperate in operating and controlling the vehicles and interfacing users with the vehicles. The components have largely replaced mechanical linkages traditionally used to operate and interface users with vehicles, and have provided the vehicles with a resolution of vehicle control and an expanding menu of functionalities and services that were impossible or impractical to implement or even to conceive of in the past.

By way of example, a modern automotive vehicle may for example be home to as many as a hundred or more electronic control units (ECUs) that communicate via the in-vehicle network with each other and with sensors and actuators that monitor and control vehicle functions to operate the vehicle and interface the vehicle with a user. The ECU's may, by way of example, be used to control the vehicle engine, power steering, transmission, antilock braking (ABS), airbag deployment, cruise control, power windows, doors, and minor adjustment. In addition, an in-vehicle network typically supports on board diagnostic (OBD) systems and communication ports, various vehicle status warning systems, such as engine temperature and TPMS (tire pressure monitor system), collision avoidance systems, keyless entry, audio and visual information and entertainment (infotainment) systems, and/or processing of images acquired by on-board camera systems. The in-vehicle network in general also provides access to mobile communication networks, Bluetooth, and/or WiFi, interfaces, vehicle to vehicle (V2V) and vehicle to infrastructure (V2I), communications, the Internet, and/or GPS (global positioning system).

Various communication protocols have been developed to configure, manage, and control communications of vehicle components that are connected to and communicate over an in-vehicle communication network. Popular in-vehicle network communication protocols currently available are CAN (control area network), FlexRay, MOST (Media Oriented Systems Transport), Ethernet, and LIN (local interconnect network). The protocols may define a communication bus and how the ECUs, sensors, and actuators, generically referred to as nodes, connected to the communication bus, access and use the bus to transmit signals to each other.

The growing multiplicity of electronic control systems, sensors, actuators, ECUs and communication interfaces and ports, that an in-vehicle communication network supports makes the in-vehicle communication network, and the vehicle components that communicate via the communication system, increasingly vulnerable to cyberattacks that may dangerously compromise vehicle safety and performance.

SUMMARY

An aspect of an embodiment of the disclosure relates to providing a module, hereinafter also referred to as a "NET-Sleuth", configured to monitor communication transmissions over at least a portion of a vehicle's in-vehicle communications network to identify which of the nodes comprised in the network are transmitting signals over the network. By identifying transmitting nodes, NET-Sleuth may operate to determine whether functioning of a node has been compromised, whether an unauthorized node is transmitting on the in-vehicle network, and whether the network itself has been compromised by damage and/or malware. In an embodiment NET-Sleuth has access to, and may operate to generate and/or dynamically update a library comprising a feature vector, which may be referred to as a "library fingerprint", for each of a plurality of nodes in the network that is peculiar to the node. A node's library fingerprint characterizes analog waveforms comprising electrical signals that the node generates to encode, and transmit digital data over the network to another node in the network. NET-Sleuth monitors the network by receiving copies of waveforms propagating over the network and comparing features of the waveforms to features of library fingerprints to determine which nodes in the network transmitted the waveforms.

In an embodiment a node's library fingerprint is based on a Fourier transform of waveforms and/or a function of waveforms that the given node transmits over the network. In an embodiment, components of the library fingerprint are based on Fourier coefficients, or amplitudes of a Fourier transform of a time derivative of the node's waveforms. Optionally, the time derivative is a time derivative of a waveform transmitted by the node in a region of the waveform corresponding to a transition between different electrical signals in the waveform representing different digital data. In an embodiment, the components of the node fingerprint are based on absolute values of the Fourier components. In an embodiment the node fingerprint may be a feature vector in a vector space spanned by a basis set of vectors determined by a principal component analysis of feature vectors whose components are absolute values of Fourier amplitudes of the Fourier transform.

In an embodiment, components of a library fingerprint comprise components of a Fourier transform of a detrended waveform feature (DWF) of a time dependent feature or time dependent function of a feature of waveforms that the given node transmits. In an embodiment, a detrended feature is a feature of a waveform detrended relative to a time dependent trend that the feature exhibits during the time span of the waveform.

Optionally, the in-vehicle communication network is a CAN network and analog waveforms that a node transmits are electrical waveforms, optionally referred to as "frame waveforms" or "CAN frame waveforms", encoding digital data that the node formats in data frames compliant with the CAN protocol.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale FIG. 1A schematically shows a vehicle comprising, optionally, a CAN in-vehicle communication network having a NET-Sleuth configured to monitor the network to identify which nodes are communicating over the network and detect anomalous messages, in accordance with an embodiment of the disclosure;

FIG. 2A schematically shows a format of a CAN message frame that may be processed by the NET-Sleuth shown in FIGS. 1A and 1B to determine which node in the in-vehicle network transmitted the frame, in accordance with an embodiment of the disclosure;

FIG. 2B shows a schematic frame waveform of a voltage signal representing bits in the CAN frame shown in FIG. 2A;

FIG. 4A schematically shows a format of a CAN message frame that may be processed by the NET-Sleuth shown in FIGS. 1A and 1B to determine which node in the in-vehicle network transmitted the frame, in accordance with an embodiment of the disclosure, wherein features of the waveform of the frame exhibit time dependent trends;

FIGS. 4B-4E show schematic graphs of waveform features over time showing respective time-dependent trends;

DETAILED DESCRIPTION

Figure 3:
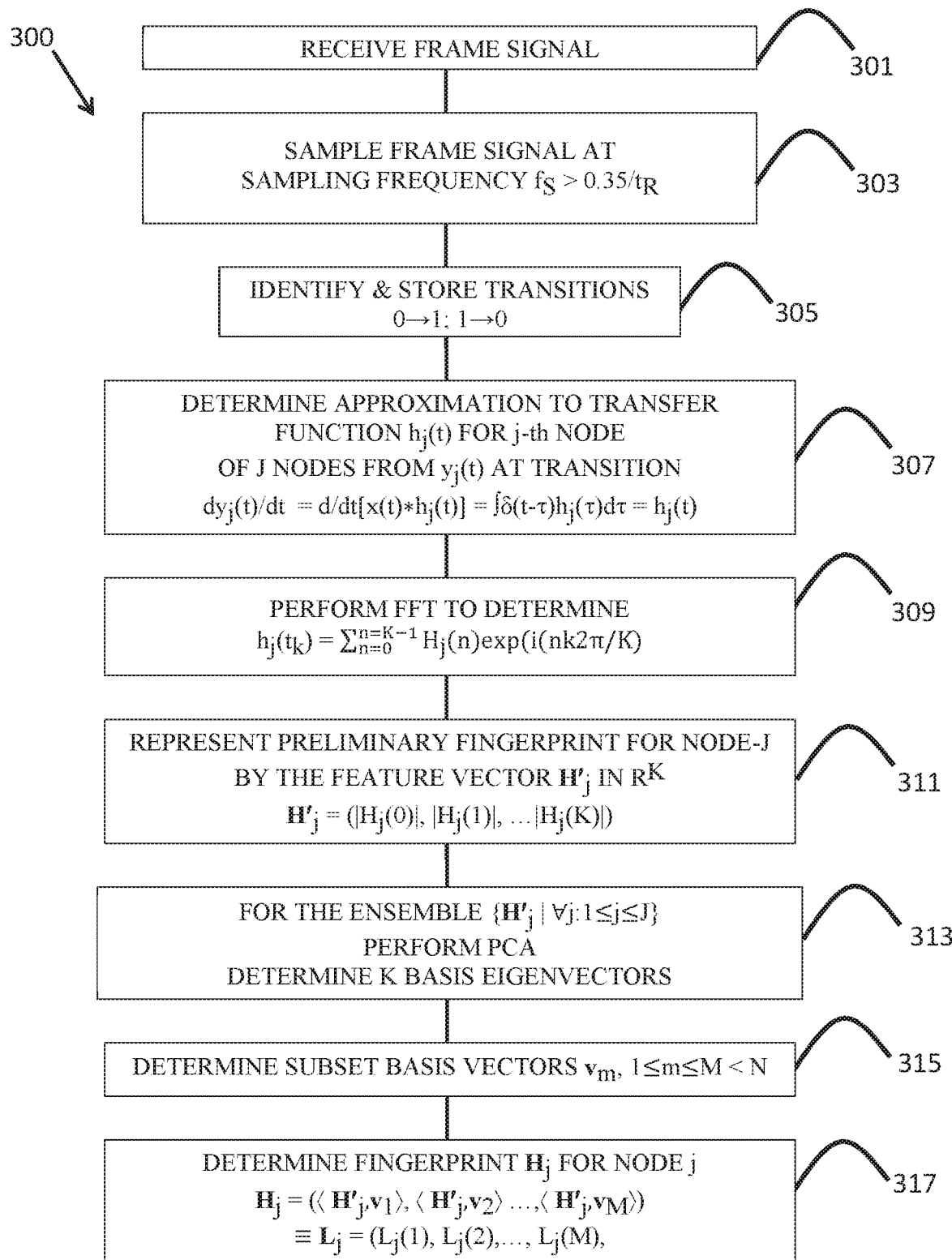
FIG. 3 shows a flow diagram of an algorithm by which a NET-Sleuth may operate to identify a node that transmitted a CAN frame waveform optionally over the in-vehicle communication network shown in FIG. 1B, in accordance with an embodiment of the disclosure.
Figure 4D:
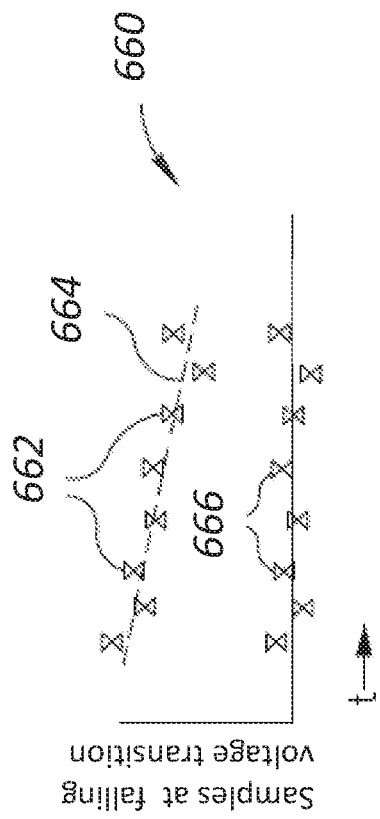
Figure 5:
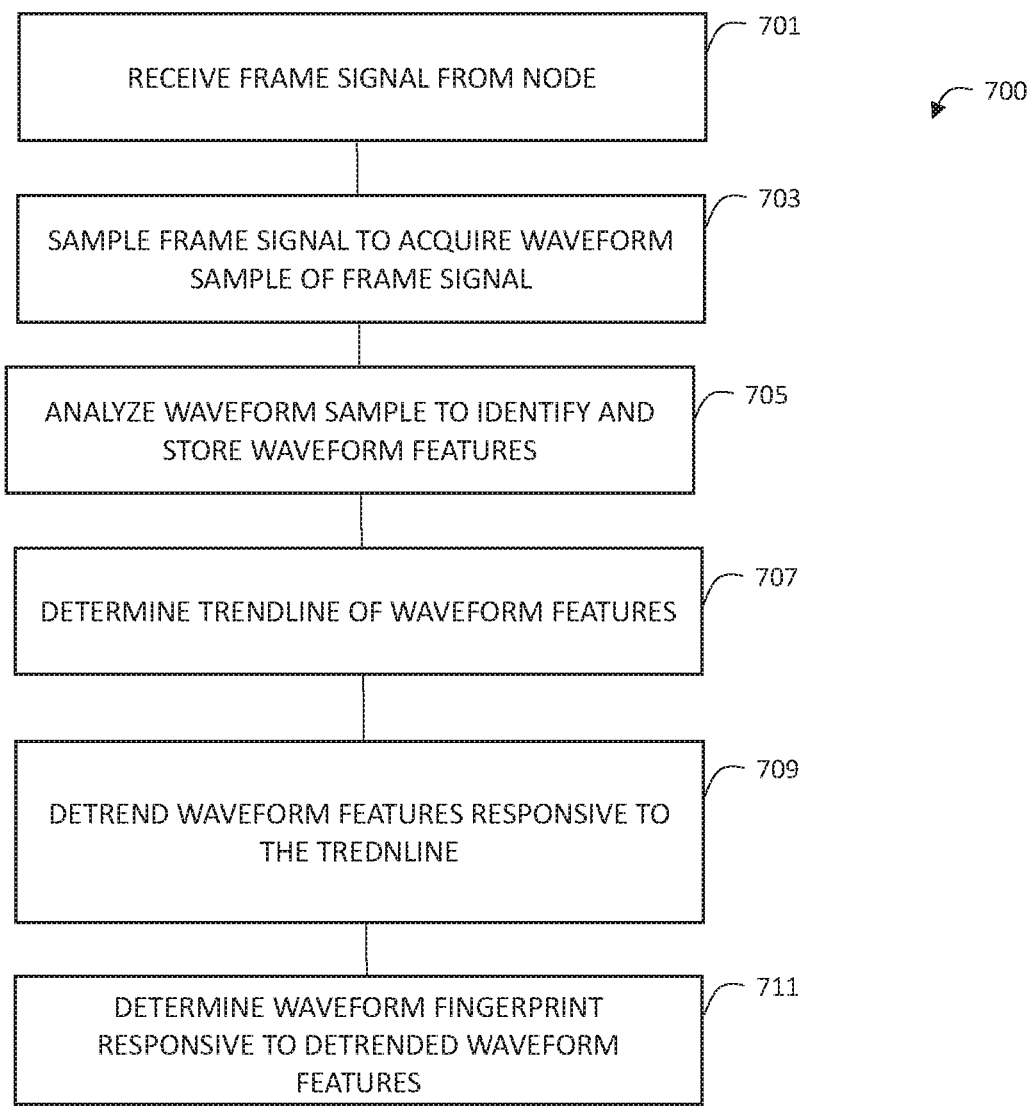
FIG. 5 shows a flow diagram of a process by which a NET-Sleuth may operate to determine a fingerprint of a node based on detrended features of a waveform generated by the node.
Figure 6:
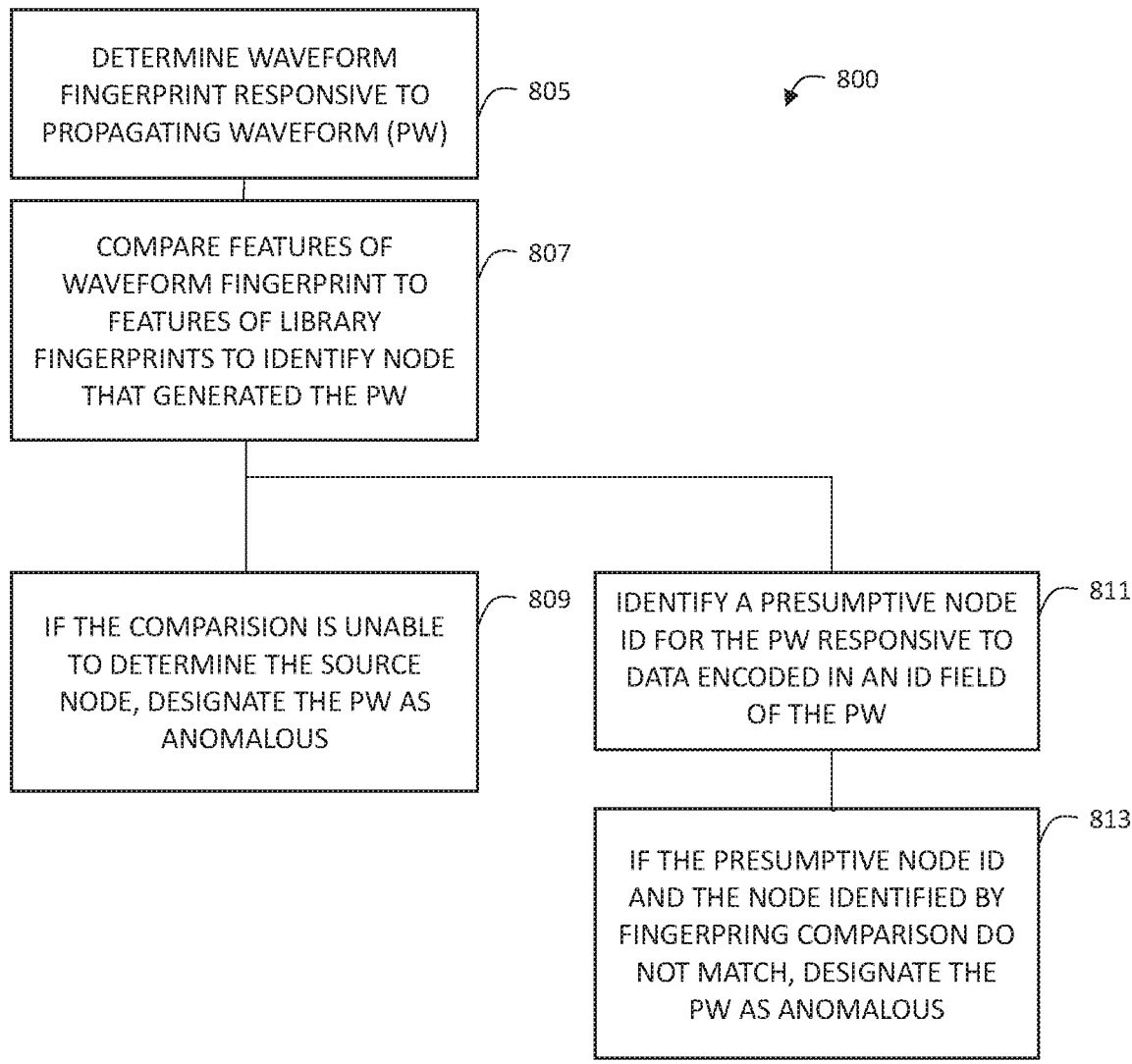
FIG. 6 shows a flow diagram of an algorithm by which a NET-Sleuth may operate to designate a frame signal transmitted from a node as anomalous, by comparing a waveform fingerprint characterizing the frame signal with library fingerprints, in accordance with an embodiment of the disclosure.
Figure 7:
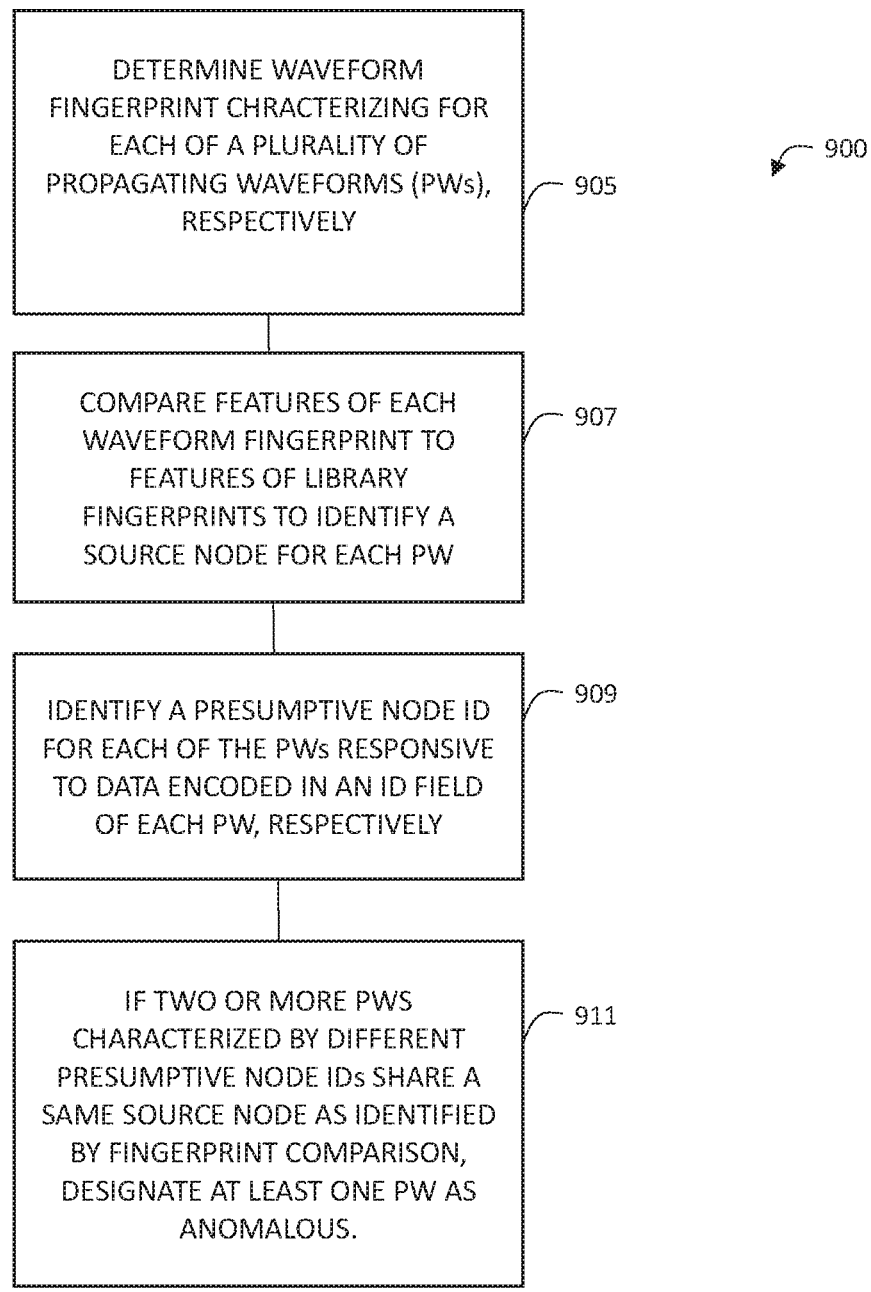
FIG. 7 shows a flow diagram of an algorithm by which a NET-Sleuth may operate to designate as anomalous at least one frame signal of a plurality of frame signals, by comparing waveform fingerprints characterizing each of the plurality of frame signals respectively with library fingerprints, in accordance with an embodiment of the disclosure.
Figure 8:
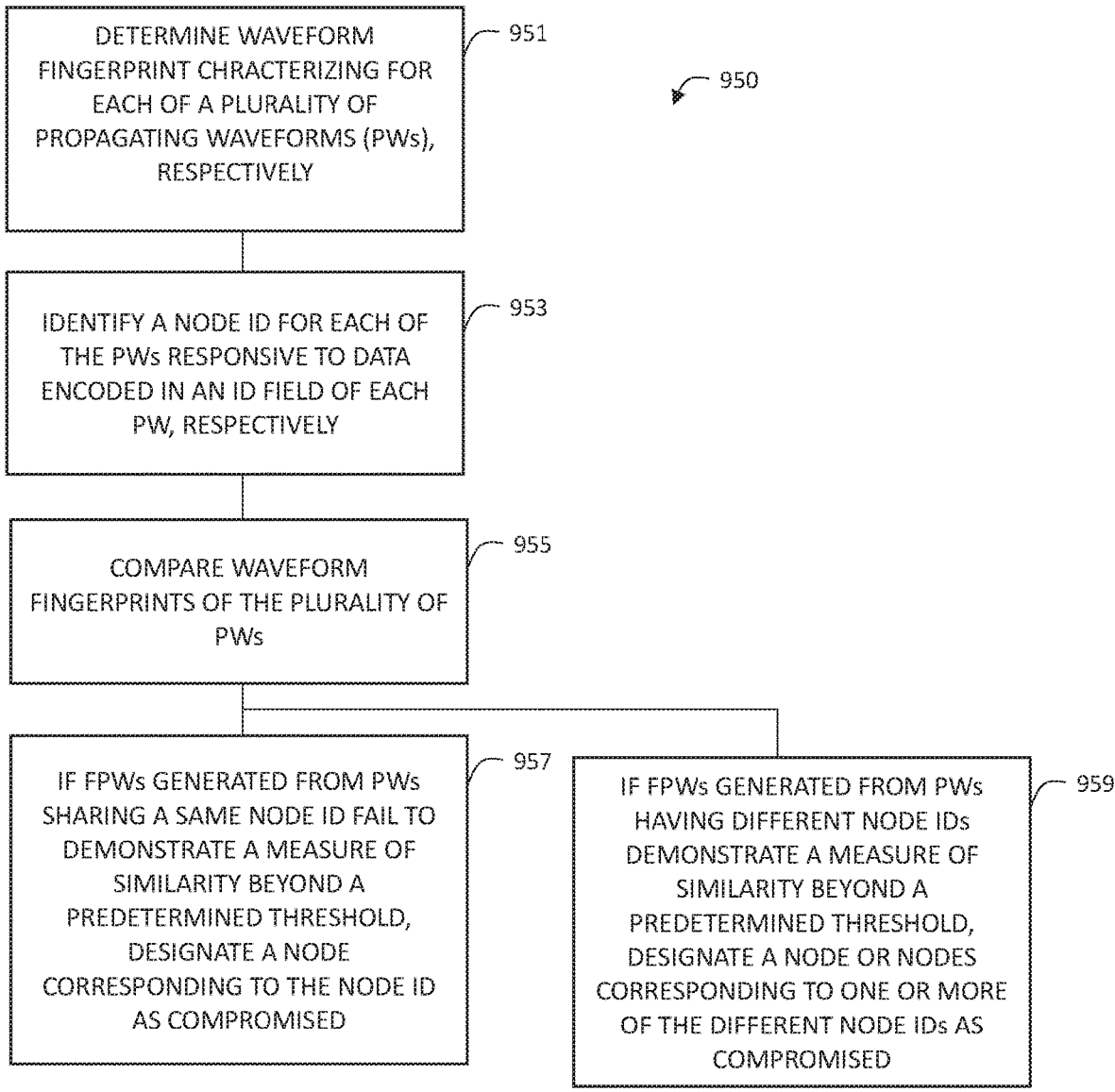
FIG. 8 shows a flow diagram of an algorithm by which a NET-Sleuth may operate to designate as anomalous at least one frame signal of a plurality of frame signals, by comparing waveform fingerprints characterizing each of the plurality of frame signals with each other.
Figure 9:
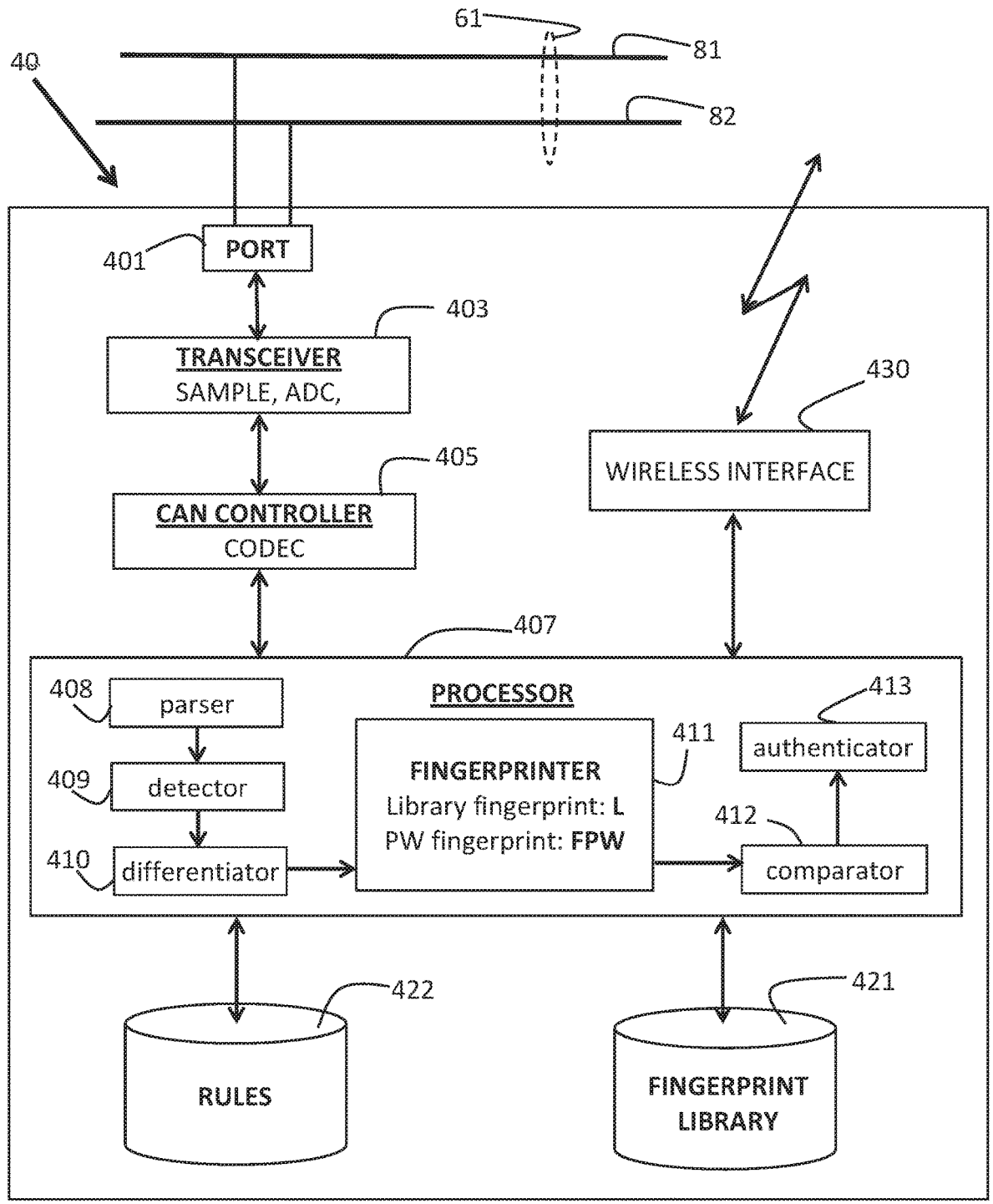
FIG. 9 shows a schematic block diagram of a NET-Sleuth configured to perform the algorithms shown in FIG. 3 or in FIGS. 5-8, in accordance with an embodiment of the disclosure.

In the detailed discussion below operation of an automotive CAN network comprising a NET-Sleuth configured to monitor the network is described with reference to FIGS. 1A and 1B. Details of digital messages and corresponding frame waveforms that nodes connected to the CAN generate and configure in accordance with a CAN protocol are discussed with reference to FIGS. 2A and 2B. FIG. 3 shows a flow diagram of a procedure that the NET-Sleuth shown in FIGS. 1A and 1B may adopt, in accordance with an embodiment of the disclosure to generate library fingerprints for nodes connected to the CAN network. FIG. 4A schematically shows a format of a CAN message frame that may be processed by the NET-Sleuth shown in FIGS. 1A and 1B to determine which node in the in-vehicle network transmitted the frame, in accordance with an embodiment of the disclosure, wherein features of the waveform of the frame exhibit time dependent trends. FIGS. 4B-E show schematic graphs of waveform features over time showing respective time-dependent trends. FIG. 5 shows a flow diagram of a process by which a NET-Sleuth may operate to determine a fingerprint of a node based on detrended features of a waveform generated by the node. FIG. 6 shows a flow diagram of an algorithm by which a NET-Sleuth may operate to designate a frame signal transmitted from a node as anomalous, by comparing a waveform fingerprint characterizing the frame signal with library fingerprints, in accordance with an embodiment of the disclosure. FIG. 7 shows a flow diagram of an algorithm by which a NET-Sleuth may operate to designate as anomalous at least one frame signal of a plurality of frame signals, by comparing waveform fingerprints characterizing each of the plurality of frame signals respectively with library fingerprints, in accordance with an embodiment of the disclosure. FIG. 8 shows a flow diagram of an algorithm by which a NET-Sleuth may operate to designate as anomalous at least one frame signal of a plurality of frame signals, by comparing waveform fingerprints characterizing each of the plurality of frame signals with each other. FIG. 9 shows a schematic block diagram of components that a NET-Sleuth may comprise to support functionalities that the NET-Sleuth provides in accordance with an embodiment of the disclosure.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1A:
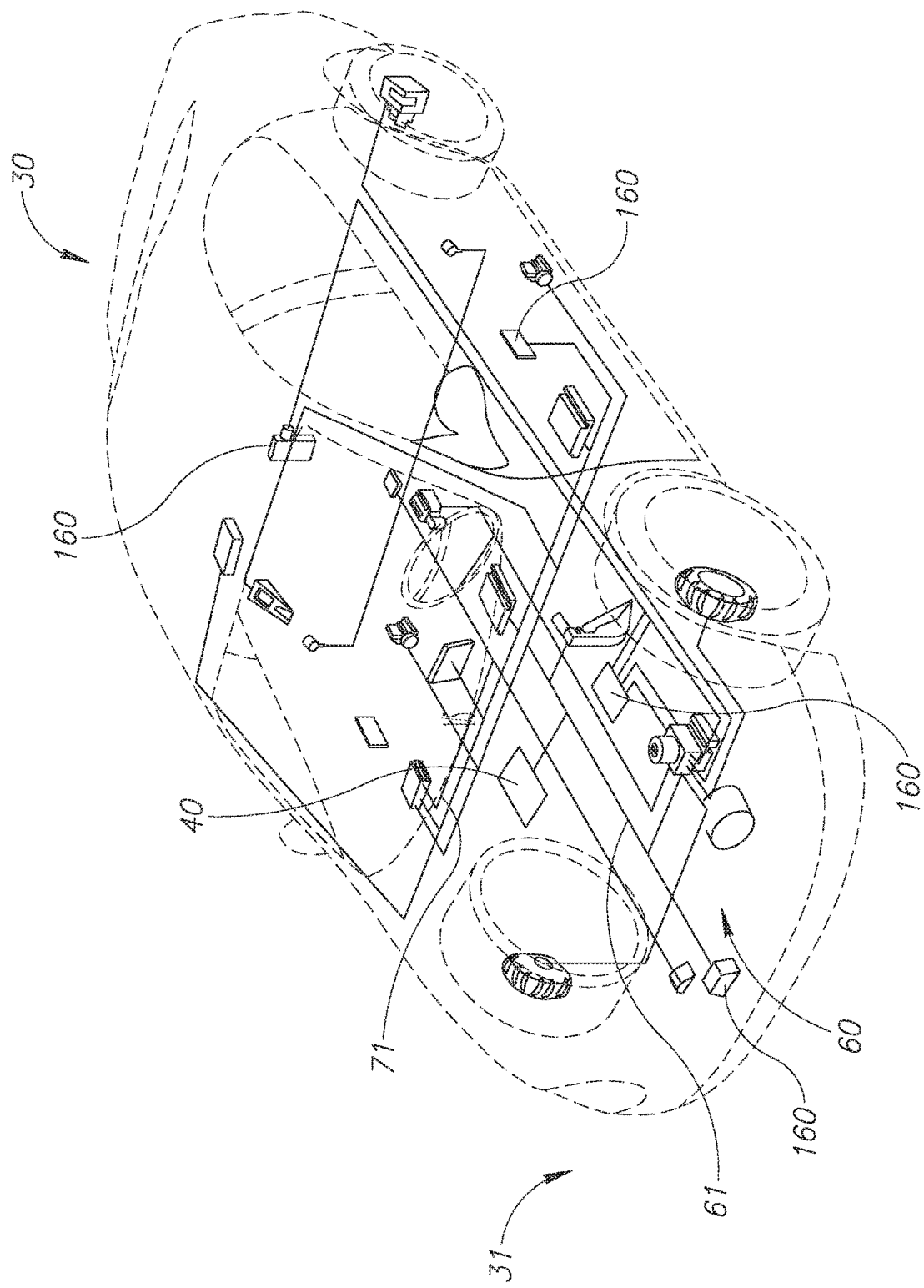
FIG. 1B shows a schematic block diagram of a portion of an in-vehicle CAN communication network protected by a NET-Sleuth, in accordance with an embodiment of the disclosure.

FIG. 1A schematically shows a vehicle 30 comprising an in-vehicle, optionally a CAN communications network 60, having a NET-Sleuth 40 installed to monitor and protect a portion of the network, in accordance with an embodiment of the disclosure. In-vehicle communications network 60 optionally comprises a high-speed CAN bus 61 and a medium-speed CAN bus 71. A plurality of components of vehicle 30, such as various ECUs, sensors, and communications devices, are connected to the buses as nodes. The nodes connected to buses 61 and 71 communicate with each other by transmitting and receiving CAN frames, which may be referred to as CAN packets, or CAN messages, via the buses. NET-Sleuth 40, in accordance with an embodiment of the disclosure, is optionally connected to high-speed CAN bus 61. Nodes in vehicle 30 that are connected to in-vehicle network 60 may generically be labeled and referred to by a numeral 160, and in FIG. 1A nodes from a selection of nodes connected to in-vehicle communications network 60 are generically indicated by the numeral 160.

Figure 1B:
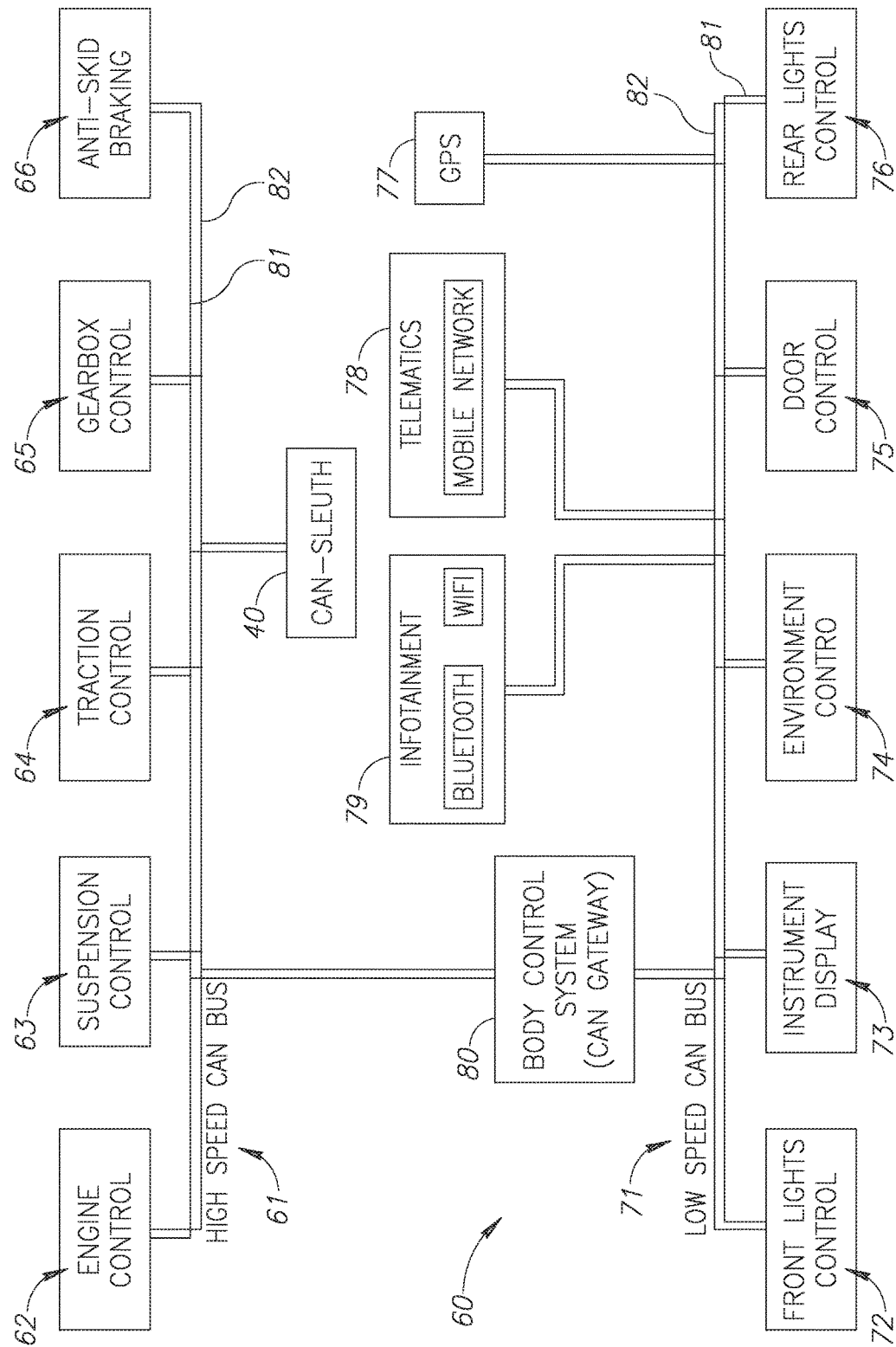

FIG. 1B shows an enlarged schematic of communications network 60, buses 61 and 71 and examples of nodes 160 connected to the buses. High-speed CAN bus 61 may be a class C CAN bus that operates at data transmission speeds up to 1 megabit per second to support communications between nodes such as sensors and ECUs of various control systems that may require relatively high-speed transmission of data between the nodes to operate properly. In FIG. 1B high-speed CAN bus 61 is shown connected to engine, suspension, traction, gearbox, and braking control systems 62, 63, 64, 65, and 66 respectively. High-speed CAN bus 61 is connected by a body control system gateway 80 to medium-speed CAN bus 71.

Medium-speed CAN bus 71 may be a class B CAN bus that operates at data transmission speeds up to 125 kilobits per second (Kbps), to support communications between nodes, such as components of vehicle body control systems and infotainment systems, that can function properly receiving and transmitting data at relatively low data transmission rates. By way of example, medium-speed CAN bus 71 is schematically shown connected to nodes that are headlight, instrument display, environment control, door control, and rear light systems 72, 73, 74, 75, and 76 respectively. An infotainment system 79 comprising Bluetooth and Wifi communications interfaces and a Telematics system 78 that provides a communications interface to mobile phone networks, and a GPS receiver 77 may also be connected to medium-speed CAN bus 71.

A CAN frame that a given node connected to in-vehicle network 60 transmits to communicate with another node typically comprises an 11 bit, or 29 bit extended arbitration or ID field, useable to identify and determine a priority of the frame, a CAN data field comprising between 0 and 8 bytes of data to be transmitted to a destination node, and a 15 bit CRC code (cyclic redundancy check). A bit that the given node transmits in the CAN frame may be either a "0" bit, referred to as a dominant bit, or a "1" bit, referred to as a recessive bit. Each CAN bus 61 and 71 typically comprises a twisted wire pair comprising a high voltage, "HV-wire" 81, and a low voltage "LV-wire" 82, and the given node transmits CAN 0 and 1 bits on bus 61 or 71 to which it is connected as respective differential voltage signals. A differential voltage signal is a voltage that is equal to a difference between voltages that the node simultaneously generates on HV-wire 81 and LV-wire 82 of the twisted wire pair.

When no CAN bits are transmitted over a bus 61 or 71, both HV-wire 81 and LV-wire 82 in the bus are biased to a common idle voltage "$V_O$". A node connected to in-vehicle network 60 generates a differential voltage signal representing a dominant, 0 bit, on bus 61 or 71 to which it is connected by driving the HV and LV wires 81 and 82 of the bus away from the common, idle voltage $V_O$ with equal and opposite voltages, $+\Delta V$ and $-\Delta V$ respectively. Typically, $V_O$ is equal to about 2.5 V (volts) and $\Delta V$ is equal to about 1 V and the node transmits a dominant, 0 bit, on the bus by driving HV-wire 81 to a voltage $V(H)=V_O+\Delta V=3.5V$ and LV-wire 82 to a voltage $V(L)=V_O-\Delta V=1.5V$ to provide a differential voltage signal $V(0)=(V(H)-V(L))$ equal to about 2 volts on the bus. The node transmits a recessive, 1 bit, on the bus by allowing the HV and LV wires 81 and 82 to return to, or remain at the idle voltage $V_O=2.5$, to provide a differential voltage signal $V(1)=(V(H)-V(L))$ on the bus equal to about 0 volts representing the recessive bit.

FIG. 2A schematically shows an example of a CAN frame 200 comprising a sequence 201 of bits 202 having dominant, 0 bits, and recessive, 1 bits, that a node attached to CAN bus 61 or 71 may transmit to another node connected to network 60 to provide the other node with data. Graph lines 281 and 282 shown below transmitted bits 202 schematically graph voltages V(H) and V(L) as a function of time that the transmitting node generates on HL-wire 81 and LV-wire 82 respectively relative to idle voltage $V_O$ of bus 61 or 71 to provide differential voltage signals V(0) and V(1) representing the transmitted bits. The time sequence of analog differential voltage signals V(0) and V(1) determined by differences between voltages V(H) and V(L) is a CAN frame waveform associated with frame 200. Differential voltage signals V(0) and V(1) may be referred to as voltage signals V(0) and V(1), voltages V(0) and V(1), CAN voltages, and/or dominant and recessive voltages respectively.

FIG. 2B schematically shows enlarged portions of V(H) and V(L) graph lines 281 and 282 shown in FIG. 2A that the transmitting node generates to transmit bits in frame 200. The figure schematically shows, in a region 221, a frame waveform voltage transition from a recessive differential voltage signal V(1) between HV-wire 81 and LV-wire 82 (FIG. 1B) equal to about 0 volts at a time $t_1$ to a dominant differential voltage signal V(0) equal to about 2 volts at a time $t_2$. A time difference $(t_2-t_1)$ may be referred to as a rise time $t_R$ from the recessive bit voltage to the dominant bit voltage. Optionally, $t_1$ is a time during transition from recessive voltage V(1) to dominant voltage V(0) at which the frame waveform voltage reaches a voltage equal to about 0.1V(0). Optionally, $t_2$ is a time during transition from voltage V(1) to voltage V(0) at which the frame waveform voltage reaches a voltage equal to about 0.9V(0). Similarly, FIG. 2B shows, in a region 222 a fall time from a dominant bit frame waveform voltage V(0) at about a time $t_3$ to a recessive bit frame waveform differential voltage V(1) at about a time $t_4$. Optionally, $t_3$ is a time during transition from dominant voltage V(0) to passive voltage V(1) at which the frame waveform voltage falls to a voltage equal to about 0.9V(0). Optionally, $t_4$ is a time during transition from dominant voltage V(0) to passive voltage V(1) at which the frame waveform voltage falls to a voltage equal to about 0.1V(0). A time difference equal to about $(t_4-t_3)$ may be referred to as a fall time, $t_F$, from a dominant bit voltage to a recessive bit voltage. Rise and fall times may generically be referred to as voltage transition times $t_T$.

In an embodiment, NET-Sleuth 40 is configured to monitor frame waveforms transmitted over CAN bus 61 and identify which nodes transmitted the frame waveforms, and, if an attempt to identify a node that transmitted a given frame waveform fails, identify the frame as anomalous. If a frame is identified as anomalous, NET-Sleuth 40 may be configured to determine and/or undertake any, or any combination of more than one, of various response actions to report, mitigate, and/or control the anomaly. Response actions that may be undertaken in response to determining that a given waveform is anomalous, may, by way of example, comprise: blocking propagation or reception of the waveform; delaying the waveform; limiting a transmission repetition frequency of the waveform; logging the waveform and/or corresponding CAN frame into a memory comprised in NET-Sleuth; transmitting the waveform, corresponding CAN frame, and/or an alert regarding occurrence of the anomaly via an optionally wireless communications interface to a server outside of vehicle 30; and/or otherwise alerting a user of the vehicle or appropriate authority to the anomaly.

To identify which node of the nodes connected to bus 61 transmits a given frame, NET-Sleuth 40 may operate to generate and/or dynamically update a library comprising a feature vector, a library fingerprint, for each node attached to bus 61 that is peculiar to the node, and may be used to determine whether features of a frame waveform transmitted over bus 61 indicate that the frame was transmitted by the node. In an embodiment components of a library fingerprint for a given node are based on Fourier components of a Fourier transform of frame waveforms that the given node transmits over bus 61.

FIG. 3 shows a flow diagram 300 of a CAN fingerprinting procedure that NET-Sleuth 40 may execute to determine a library fingerprint for a j-th node, also referred to as "node-j", of J nodes connected to in-vehicle communications network 60, in accordance with an embodiment of the disclosure. The CAN fingerprinting procedure illustrated by flow diagram 300 may be referred to by the same reference numeral, 300, that labels the flow diagram.

In a block 301 of procedure 300, NET-Sleuth 40 receives voltage signals from bus 61 to which the Net-Sleuth is connected that define a frame waveform transmitted over the bus by the j-th node. The frame waveform may be identified as transmitted by node-j by the ID field of the frame waveform under an assumption that the nodes connected to buses 61 and 71 (FIG. 1B) in in-vehicle network 60 and the network are uncompromised by malware, and are operating properly. In a block 303, NET-Sleuth 40 samples the frame waveform to acquire frame waveform samples at a sampling frequency, "$f_S$", sufficient to determine magnitudes of voltage transition times $t_T$ between dominant and recessive bit voltages V(0) and V(1) in the received frame waveform. Optionally, $f_S$ is determined so that $f_S > 0.35/t_T$. In an embodiment $t_T$ may be about 10 ns (nanoseconds) and $f_S$ is advantageously greater than about 350 MHz (megahertz)

In an embodiment, in a block 305, NET-Sleuth 40 processes the frame waveform samples to identify signal voltage transitions between dominant and recessive bit voltages V(0) and V(1). NET-Sleuth 40 may identify the transitions by locating where in the received frame waveform a dominant or recessive voltage changes to a recessive or dominant voltage respectively. Optionally, a change between a recessive voltage and a dominant voltage in the waveform is located by locating portions of the waveform that crosses a predetermined threshold voltage. Optionally, the identified signal voltage transitions consist of rising transitions, falling transitions, or both rising and falling transitions. In a block 307 NET-Sleuth 40 processes waveform samples acquired during a transition time associated with an identified voltage transition to determine a function responsive to a transfer function, $h_j(t)$, of node-j from which to determine a library fingerprint for the node, in accordance with an embodiment of the disclosure. The transfer function $h_j(t)$ of node-j describes how circuitry, such as a CAN transceiver, comprised in node-j translates a digital sequence of bits, such as by way of example sequence 201 of bits 202 (FIG. 2A), to be transmitted by the node in a CAN frame to corresponding differential voltages V(0) and V(1) in a frame waveform for transmission over bus 61.

Let a function $x_j(t)$ of time t, represent the digital sequence of bits to be transmitted as a corresponding frame waveform, $y_j(t)$, by node-j. Frame waveform $y_j(t)$ may be written as a convolution, $$y_j(t)=x_j(t)*h_j(t)=\int_0^\infty x(t-\tau)h_j(\tau)d\tau \qquad (1)$$

and a sample of $y_j(t)$ acquired by NET-Sleuth 40 at a given sampling time $t_k$ of "K" sampling times during the transition time of the identified transition may be defined by an expression, $$y_j(t_k)=x_j(t)*h_j(t)|_{t_k}=\int_0^\infty x(t_k-\tau)h_j(\tau)d\tau. \qquad (2)$$

In an embodiment, in block 307, NET-Sleuth 40 processes the samples $y_j(t_k)$ to determine values for the derivative of $y_j(t)$ at optionally the discrete sampling times $t_k$ to acquire a discrete time sequence, $$(dy_j(t_1)/dt, dy_j(t_2)/dt, \ldots dy_j(t_{K-1})/dt)(0 \leq k \leq K-1) \text{ of } K \text{ values of the derivative.} \qquad (3)$$

At a time $t_k$ the derivative of $y_j(t)$ may be written, $$dy_j(t_k)/dt=d/dt(x(t)*h_j(t))|_{t_k}=(d/dt[\int_0^\infty x(t-\tau)h_j(\tau)d\tau])|_{t_k}=(\int_0^\infty (dx(t_k-\tau)/dt)h_j(\tau)d\tau)|_{t_k}. \qquad (4)$$

During the transition time, were $x_j(t)$ to approximate an ideal Heaviside step function $\theta(t)$ the derivative $dx(t_k-\tau)/dt$ in expression (4) would approximate a derivative of the Heaviside function and therefore a delta function. In symbols, assuming that the transition time is a rise time associated with a voltage transition from a recessive voltage V(1) to a dominant voltage V(0), $$dx(t_k-\tau)/dt \sim d\theta(t_k)/dt = \delta(t_k). \qquad (5)$$

Expression (3) may therefore be rewritten as, $$dy_j(t_k)/dt \sim \int_0^\infty (\delta(t_k)h_j(\tau)d\tau = h_j(t_k). \qquad (6)$$

It is noted that where the transition time is associated with a voltage transition from a dominant bit 0 to a recessive bit 1, the transition time would be a fall time and expressions (5) and (6) would apply with a minus sign preceding the term on the right of the equals sign.

From the above, it is seen that the derivative $dy_j(t_k)/dt$ is a function that is expected to be responsive to, and may provide an approximation of the transfer function $h_j(t)$ of node-j at time $t_k$. In an embodiment, NET-Sleuth 40 may use the discrete time sequence $(dy_j(t_0)/dt, dy_j(t_2)/dt, \ldots dy_j(t_{K-1})/dt)$ to provide a library fingerprint for node-j. Defining $dy_j(t_k)/dt \equiv h_j(t_k)$, the discrete time sequence may conveniently be written $$(h_j(t_0), h_j(t_2), \ldots h_j(t_{K-1})). \qquad (7)$$

In an embodiment, in a block 309 NET-Sleuth 40 may determine a discrete Fourier transform for $(h_j(t_0), h_j(t_2), \ldots h_j(t_{K-1}))$ so that $$h_j(t_k)=\Sigma_{n=1}^{n=K-1}H_j(n)\exp(i(nk2T\pi/K)). \qquad (8)$$

And in a block 311 Net-Sleuth 40 may determine a preliminary library fingerprint for node-j that is a K dimensional real vector "$H'_j$", having components that are the absolute values of the Fourier amplitudes $H_j(n)$ so that $$H'_j=\{|H_j(0)|, |H_j(1)|, \ldots |H_j(K-1)|\}. \qquad (9)$$

Optionally, Net-Sleuth 40 determines a temporary library fingerprint in accordance with procedures referred to in blocks 301-311, for each of a plurality of instances of rise times and fall times in at least one or more frame waveforms that node-j transmits and determines $H'_j$ as an average of the temporary CAN fingerprints.

Optionally, NET-Sleuth 40 determines a preliminary library fingerprint $H'_j$ for each of J nodes and in a block 313, NET-Sleuth 40 processes an ensemble of the J preliminary library fingerprints to perform a principal component analysis and determine a basis set of K orthogonal eigenvectors that span the vector space of the $H'_j$. In a block 315 Net-Sleuth 40 may select a subset of M<K unit vectors $v_m$, 1≤m≤M<K, from the set of K eigenvectors to span an M-dimensional vector space, optionally referred to as an "M-space", that may be used to account for an advantageous portion of a variance in the preliminary fingerprints $H'_j$. In an embodiment, the advantageous portion is greater than 80% of the variance. Optionally the advantageous portion is greater than 90% of the variance.

In an embodiment, NET-Sleuth 40 determines a library fingerprint $H_j$ normalized to unit length in the M-space for each of the J nodes and for which a library fingerprint $H_j$ for the j-th node has components that are proportional to the scalar products of preliminary library fingerprint $H'_j$ for the node with the basis vectors $v_m$. The library fingerprint $H_j$ for the j-th node may be written, $$H_j = (\langle H'_j, v_1 \rangle, \langle H'_j, v_2 \rangle \ldots \langle H'_j, v_M \rangle), \quad (10)$$

where $\langle H_j, v_m \rangle$ represent a scalar product of $H'_j$ with the m-th basis vector $v_m$. Letting $L_j(m) = \langle H'_j, v_m \rangle$ expression (10) may be rewritten so that a library fingerprint for the j-th node may be given by an M-tuple $L_j$ for which, $$L_j = (L_j(1), L_j(2), \ldots L_j(M)). \quad (11)$$

Whereas in the above discussion, a node generating a frame waveform is described as identified from data encoded in the ID field of the waveform a library of library fingerprints may be produced absent associating waveforms with nodes based on the ID fields of the waveforms. For example, fingerprints on a basis vector set $v_m$ may be generated by NET-Sleuth 40 for a plurality of frame waveforms from a plurality of different nodes without identifying any of the waveforms or the fingerprints with any node. NET-Sleuth 40 may generate the fingerprints in accordance with an algorithm similar to algorithm 300 illustrated in FIG. 3 or algorithm 700 illustrated in FIG. 5. The fingerprints may be clustered into clusters using for example, any of various k-means clustering algorithms and centroid vectors of the clusters used as library fingerprints.

In an embodiment, a fingerprint, by way of example a library fingerprint $L_j$ for a given node-j may be based on a Fourier transform of a detrended time sequence of features of a waveform generated by node-j.

FIG. 4A schematically shows graph lines 381 and 382 representing voltage signals V(H) and V(L) respectively that node-j may by way of example generate to provide a waveform representing sequence 201 of dominant, 0 bits, and recessive, 1 bits (as also shown in FIG. 2A). Voltage graph lines 381 and 382 as shown in FIG. 4A are similar to voltage graph lines 281 and 282 as shown in FIG. 2A, except that features of voltage graph lines 381 and 382 exhibit time dependent trends that generate corresponding time dependent trends in dominant differential voltage signals V(0) and recessive differential voltage V(1) of the waveform representing bit sequence 201. By way of example, dominant differential voltage signals V(0) (calculated as V(H)−V(L)) indicated by arrowed witness lines 500 at various times t of the waveform exhibit a decreasing trend generated by trends in voltages V(H) and V(L), as indicated by trendlines lines 501 and 502. Also by way of example, rise times at rising voltage transitions from V(1) to V(0) indicated by block arrow 503 and fall times at falling voltage transitions from V(0) to V(1) indicated by block arrows 504 exhibit an increasing trend with time t.

In accordance with an embodiment of the disclosure, a trend of a time sequence of features may be identified and subtracted from the feature to provide a detrended version of the time sequence of features. Optionally, the detrending is performed relative to a time-dependent trend that the feature exhibits during a time span of the waveform. The detrended time sequence of features may then be subjected to an integral transform to provide a fingerprint for node-j comprising coefficients of the transformed detrended features.

Examples of time sequences of features from which trends are subtracted for detrending include one or more of: dominant voltage signals V(0), voltage signals during a rising voltage transition from V(1) to V(0), voltage signals during a falling voltage transition from (V(0) to V(1), rise times of voltage transitions during a frame, and fall times of voltage transitions during a frame. The detrended features may then be Fourier transformed to provide Fourier coefficients for a library fingerprint $L_j$ for node-j.

FIG. 4B shows a schematic graph 600 of samples 602 of voltage signal V(0) generated by a difference between V(H) 381 and V(L) 382 as shown in FIG. 4A, between times labeled $t_n$ and $t_{n+N}$. Samples 602 are indicated as characterized by an optionally linear, decreasing trend line 604. Samples 602 that have undergone detrending are indicated by detrended samples 606.

FIG. 4C shows a schematic graph 650 of samples 652 of rise times at the seven instances of rising voltage transitions 503 in voltage signals V(H) and V(L) as shown in FIG. 4A. As noted above and as shown in FIG. 4A (graph lines 381 and 382), the rise times exhibit an increasing trend with time t. As such, samples 652 are indicated as characterized by an optionally linear, increasing trend line 654. Samples 652 that have undergone detrending are indicated by detrended samples 656.

FIG. 4D shows a schematic graph 660 of samples 662 of voltage signal calculated as a difference between V(H) 381 and V(L) 382 during a falling voltage transition from a dominant voltage signal V(0) to a recessive voltage signal V(1), as indicated by block arrows 504 in FIG. 4A. Samples 662 are indicated as characterized by an optionally linear, decreasing trend line 664. Optionally, trend line 664 characterizes a simplified linear model of a change in voltage during a falling voltage transition.

Figure 4E:
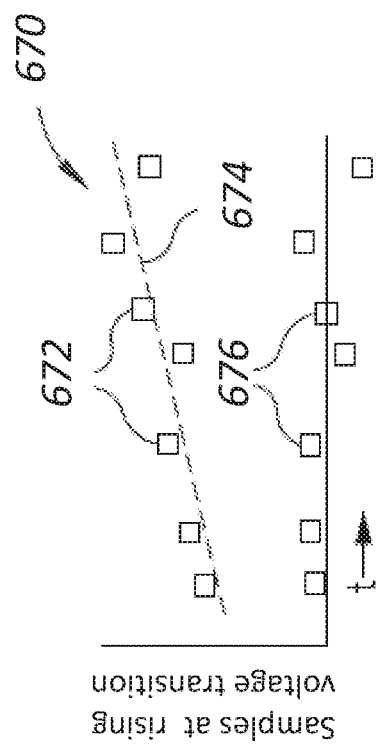

FIG. 4E shows a schematic graph 670 of samples 672 of voltage signal calculated as a difference between V(H) 381 and V(L) 382 during a rising voltage transition from a recessive voltage signal V(1) to a dominant voltage signal V(0), as indicated by block arrows 503 in FIG. 4A. Samples 672 are indicated as characterized by an optionally linear, increasing trend line 674. Optionally, trendline 674 characterizes a simplified linear model of a change in voltage during a rising voltage transition.

A trend line in accordance with an embodiment of the disclosure, by way of example trendlines 604, 654, 664, and 674 as shown in FIGS. 4B, 4C, 4D and 4E, respectively, may be determined by any of various regression algorithms such as a least squares algorithm. Optionally, the trendline comprises a straight line drawn between a first sample and a last sample of the samples. Optionally, the trendline is a curved line (not shown) that is determined by any of various curve-fitting algorithms Reference is made to FIG. 5, which shows a flow diagram of a fingerprinting procedure 700 that NET-Sleuth 40 may execute to determine a library fingerprint for a j-th node responsive to detrended features of a waveform generated by the j-th node, in accordance with an embodiment of the disclosure.

In a block 701 of procedure 700, NET-Sleuth 40 receives voltage signals from bus 61 to which the Net-Sleuth is connected that define a frame waveform transmitted over the bus by the j-th node. The frame waveform may be identified as transmitted by node-j by the ID field of the frame waveform under an assumption that the nodes connected to buses 61 and 71 (FIG. 1B) in in-vehicle network 60 and the network are uncompromised by malware and are operating properly. In a block 703, NET-Sleuth 40 samples the frame waveform to acquire frame waveform samples.

In a block 705, NET-Sleuth 40 processes the frame waveform samples to one or more identify waveform features, by way of example dominant voltage signals V(0), voltage signals during a rising and/or falling voltage transition, rise times of voltage transitions, and fall times of voltage transitions. In a block 707, NET-Sleuth 40 processes the waveform features to determine a trendline, and in a block 709, detrends the waveform features responsive to the trendline, to provide detrended waveform features.

In a block 711, NET-Sleuth 40 determines a library fingerprint of node-j responsive to the detrended waveform features by performing an integral, optionally a Fourier, transform of the detrended waveform features to create a discrete transform sequence of a function of the sequence of features, the transform sequence comprising a sequence of functions multiplied by respective amplitudes.

In an embodiment, a NET Sleuth such as NET-Sleuth 40 uses library fingerprints, by way of example library fingerprints $L_j$ as described with reference to FIG. 3, to determine whether a waveform propagating over bus 61 is a frame waveform generated by a node for which it has a library fingerprint and if so which of the nodes generated the waveform.

Let a propagating waveform that NET-Sleuth receives from bus 61 be represented by PW. In an embodiment NET-Sleuth processes the waveform to determine a feature vector, a fingerprint "FPW" (which may be referred to herein as a "waveform fingerprint"), for the waveform, having components FP(m) in the M-space in which library fingerprints $L_j$ are defined. In symbols, $$FPW=(FP(1),FP(2), \ldots FP(M). \quad (12)$$

Waveform fingerprint FPW may be determined by acquiring samples of waveform PW and processing the samples similarly to a manner in which samples of waveforms are processed to generate library fingerprint in according with an embodiment of the disclosure, by way of example in accordance with process 300 shown in FIG. 3 or with process 700 shown in FIG. 5.

In an embodiment, NET-Sleuth 40 may process FPW in accordance with any of various algorithms and criteria to determine if propagating waveform PW was generated by a node for which NET-Sleuth 40 has a library fingerprint $L_j$ and/or is an anomalous waveform that warrants undertaking action and, optionally, which action to undertake.

Reference is now made to FIG. 6, which shows a flow diagram of a process 800 by which a NET-Sleuth, by way of example Net-Sleuth 40, may operate to designate a frame signal transmitted from a node as anomalous.

In block 805 of process 800, Net-Sleuth 40 determines a waveform fingerprint FPW responsive to a propagating waveform PW. In block 807, Net-Sleuth 40 compares features of waveform fingerprint FPW to features of library fingerprints to identify the node that generated the propagating waveform PW.

Optionally, in block 809, if the comparison (block 807) does not result in a successful identification of the node that generated the PW, NET-Sleuth designates the PW as anomalous.

In an embodiment, the comparison (block 807) comprises calculating a scalar product, $\langle FPW, L_j \rangle$, for waveform fingerprint FPW with each library fingerprint $L_j$. NET-Sleuth 40 may determine that the waveform PW is a frame waveform generated by a particular node-j only if the scalar product $\langle FPW, L_j \rangle$ for the waveform is greater than the scalar products calculated for any of the other library fingerprints. Optionally, NET-Sleuth 40 may require that the scalar product of the particular node-j be greater than a predetermined threshold. Optionally, the threshold is equal to 0.8. In an embodiment, the threshold may be equal to 0.9. The threshold may be determined to be such that it corresponds to a desired confidence level responsive to a variance determined for frame waveforms generated by the particular node-j. Optionally, the confidence level is greater than or equal to about 0.9. In an embodiment, NET-Sleuth 40 may determine that a given FPW is not anomalous if a particular node-j under normal, non-compromised operation of in-vehicle network 60, may transmit a CAN frame that would give rise to the FPW and scalar product $\langle FPW, L_j \rangle$ is in a group of largest scalar products of FPW and library fingerprints calculated for a plurality of nodes of the network. Optionally NET-Sleuth 40 may use a support vector machine (SVM) to determine to which library vector $L_j$ to associate FPW.

In an embodiment, NET-Sleuth 40 may determine a probability that PW was generated by a j-th node assuming a multivariate Gaussian distribution of fingerprints FPW for waveforms generated by node-j. Therefore, since the basis vectors $v_m$ are orthogonal, if $\mathcal{P}(j) \equiv \mathcal{P}(FPW|L_j)$ represents a probability that FPW corresponds to a frame waveform generated by a j-th node, $$\mathcal{P}(FPW \mid L_j) = (1/[2\pi^{M/2\sigma} 1\sigma 2 \ldots {}^{\sigma}M])\exp - $$
$$\left[ \frac{(FP(1) - L_j(1))^2}{\sigma_1^2} + \frac{(FP(2) - Lj(2))^2}{\sigma_2^2} + \ldots + \frac{(FP(M) - L_j(M)^2}{\sigma_3^2} \right],$$

where $\sigma_m$ is a standard deviation for component $L_j(m)$ of library fingerprint $L_j$. NET-Sleuth 40 may determine that waveform PW was generated by node-j only if $\mathcal{P}(FPW|L_j)$ is greater than a predetermined threshold $\mathcal{P}*$ and greater than a probability $\mathcal{P}(FPW|L_S)$ for any s not equal to j, that is $\mathcal{P}(FPW|L_j) = \text{Max}(\mathcal{P}(FPW|L_S)|\forall s: 1 < s < J$ and $\mathcal{P}(FPW|L_j) > \mathcal{P}*)$. A FPW that NET-Sleuth 40 determines corresponds to a bonafide frame waveform generated by a node-j may be referred to as $FPW_j$.

Optionally in searching for a match to a waveform fingerprint FPW, NET-Sleuth 40 may prioritize selection of nodes for performing the search so that the nodes are checked for a match in accordance with an ordered list of the nodes. For example, NET-Sleuth 40 may check nodes for a match in order of frequency with which the nodes transmit frame waveforms over in-vehicle network 60. Alternatively or additionally NET-Sleuth 40 may search nodes for a match based on physical and/or logical location in network 60. Nodes physically closer to NET-Sleuth 40 may be checked for a match before nodes further from the NET-Sleuth. Or nodes that have greater critically for safe operation of vehicle 30 may be checked before nodes having less criticality.

In an embodiment, NET-Sleuth 40 may be configured to log into a memory, such as memory 221 described below with reference to FIG. 9, an elapsed time for each node-j since a frame waveform generated by the node was matched to a waveform fingerprint FPW. If the elapsed time for a given node is greater than a threshold time period, NET-Sleuth 40 may be configured to transmit a CAN frame to the given node that causes the given node to respond and transmit a response frame waveform or a plurality of response frame waveforms. NET-Sleuth 40 may process the response waveform or waveforms to determine a "response" fingerprint for the given node. NET-Sleuth 40 may compare the response fingerprint with a library fingerprint that NET-Sleuth 40 has for the given node in a memory, such as memory 221 discussed below to determine if there is a difference between components of the response fingerprint and the library fingerprint that indicates drift in any of the components of the library fingerprint. If there is a difference, NET-Sleuth 40 may use the difference to update the library fingerprint.

For some nodes a frame waveform that they generate may be nondescript and difficult to distinguish from other waveforms that propagate over in-vehicle network 60. For a given node that generates nondescript waveforms, NET-Sleuth 40 may operate to cooperate with an operating system of the in-vehicle network, or an entity authorized to update the network and/or components in the network to configure the given node to tag waveforms that it generates to facilitate distinguishing the waveforms. A tag may for example comprise a modification of a rise time, fall time, pulse width, and/or configure a voltage pattern of a sequence of dominant voltages that the node transmits with a particular variation in voltage.

In an embodiment, NET-Sleuth 40 may be configured to require that a waveform PW meet intrusion detection and preventing constraints additional to constraints based on library fingerprints $L_j$ discussed above. For example, after determining that a waveform's fingerprint FPW appears to associate the waveform with a particular node-j, NET-Sleuth 40 may process data encoded in the waveform to determine if the waveform is a non-anomalous, bonafide frame waveform of node-j.

In an embodiment, in blocks 811 and 813 of process 800, for determining if the PW is a bonafide non-anomalous waveform, NET-Sleuth 40 is operable to determine if a node ID encoded in an ID field of the PW corresponds to the node as identified by the comparison of the waveform fingerprint FPW with the fingerprint library (block 707). Optionally, NET-Sleuth 40 designates the propagating waveform as anomalous if there is a lack of correspondence.

Reference is now made to FIG. 7, showing a flow diagram of process 900 in accordance with an embodiment of the invention, in which a NET-Sleuth, by way of example NET-Sleuth 40, may operate to designate as anomalous at least one PW of a plurality of PWs, by comparing waveform fingerprints characterizing each of the plurality of PWs respectively with library fingerprints.

In an embodiment, in block 905 of process 900, Net-Sleuth 40 determines a waveform fingerprint FPW characterizing each of a plurality of PWs generated by nodes connected to the in-vehicle network. In block 907, NET-Sleuth 40 compares features of each FPW to features of library fingerprints $L_j$ to identify the node that generated each PW.

Optionally, in block 909, NET-Sleuth 40 identifies a presumptive node ID for each of the PWs responsive to data encoded in an ID field of the respective PWs, and in block 911, the NET-Sleuth designates at least of the PWs as being anomalous if multiple PWs identified as being generated by a same node based on a comparison of the respective waveform fingerprints with the library fingerprints (block 907) encode different node IDs in their respective ID fields (block 909).

In an embodiment, a Net-Sleuth is operable to detect anomalous PWs and/or compromised nodes by comparing FPWs of multiple PWs with each other. Advantageously, such a comparison procedure allows for attacks to be detected without requiring use of library fingerprints. Reference is made to FIG. 8, which shows a flow diagram of process 950 in accordance with an embodiment of the disclosure, in which Net-Sleuth 40 may operate to designate anomalous PWs and/or compromised nodes by comparing FPWs characterizing each of the plurality of PWs respectively with each other. The comparing of FPWs with other FPWs may be performed in the same way as a comparison between FPWs and library fingerprints as described herein, by way of example with respect of block 807 of process 800.

In an embodiment, in block 951 of process 950, Net-Sleuth 40 determines a waveform fingerprint FPW characterizing each of a plurality of PWs. In block 953, NET-Sleuth 40 identifies a node ID for each of the PWs responsive to data encoded in an ID field of the respective PWs. In block 955, NET-Sleuth 40 compares at least a portion of the FPWs with each other.

Optionally, in block 957, if the comparison of the FPWs reveal that FPWs generated from PWs sharing a same node ID as encoded in the respective ID fields fail to demonstrate a measure of similarity beyond a predetermined threshold, the node corresponding to the node ID is designated as compromised and the PWs are optionally designated as anomalous.

Alternatively or additionally, in block 959, if the comparison of the FPWs reveal that FPWs generated from PWs having different node IDs as encoded in the respective ID fields fail to demonstrate a measure of similarity beyond a predetermined threshold, a node or nodes corresponding one or more of the different node IDs are designated as being compromised.

In an embodiment, the Net-Sleuth may determine whether data encoded in the propagating waveform PW is appropriate for a context of vehicle 30 at a time at which the waveform was transmitted. A vehicle context may comprise an operating state of the vehicle and/or circumstances under which the vehicle is operating. An operating state of an automotive vehicle, such as vehicle 30 may by way of example, comprise, vehicle speed, tire pressure, ambient temperature, vehicle load, and state of health. Circumstances under which the vehicle is operating may, by way of example, comprise road grade and/or traction, ambient temperature and/or humidity, and/or season.

Whereas in the above description, intrusion and detection constraints, such as constraints based on data encoded in a frame waveform and vehicle context, are adjunct to library fingerprint constraints, in an embodiment, library fingerprint constraints applied to a network by a NET-Sleuth in accordance with an embodiment of the disclosure may be adjunct to intrusion and detection constraints. For example, an intrusion detection and prevention system (IDPS) may recognize that an anomaly exists in frame waveforms propagating in an in-vehicle network, but be unable to distinguish which of the waveforms are anomalous. A NET-Sleuth similar to NET-Sleuth 40 may be able to determine which of the waveforms are bonafide waveforms and which are anomalous and possible malware waveforms by implementing library fingerprint constraints on the waveforms.

It is noted that library fingerprints $L_j$ determined for vehicle 30 and in-vehicle network 30 are subject to change under different conditions of operation of vehicle 30, and in response to changes in the vehicle and the in-vehicle network. For example bonafide frame waveforms that a node connected to in-vehicle network 60 transmits may change as a function of time from a time when vehicle 30 is first started as a result of changes in temperature of the vehicle components during travel. In an embodiment NET-Sleuth 40 may accommodate such changes by dynamically updating library fingerprints $L_j$. By way of example following an initial determination of a library fingerprint $L_j$ for a node-j, for example in accordance with algorithm 300 (FIG. 3) or with algorithm 700 (FIG. 5), NET-Sleuth 40 may dynamically update $L_j$ by calculating $L_j$ as a running average, with the average updated for each new waveform for which NET-Sleuth 40 generates a fingerprint $FPW_j$ and determines that the waveform is a bonafide waveform of node-j. Or, NET-Sleuth 40 may update $L_j$, using an exponential smoothing algorithm for which, given a library fingerprint $L_j(t)$ at time t and a new waveform fingerprint $FPW_j(t)$, NET-Sleuth 40 may dynamically update the library fingerprint at a time (t+1) in accordance with an expression, $$L_j(t+1)=(1-\alpha)L_j(t)+\alpha FPW_j(t). \qquad (14)$$

Updating library fingerprints as described above may, generally, be viable for relatively gradual changes in components of library fingerprints $L_j$, however a vehicle and/or a vehicle's in-vehicle network may be subject to relatively sudden, hereinafter also referred to as "abrupt" changes. Abrupt changes may for example be generated by an addition or removal of a node from the in-vehicle network, a failure of a sensor or ECU connected to the network that loads a bus in the network with an anomalous low impedance, or physical damage to a HV-wire or LV-wire of a bus. An abrupt change may be expected to change frame waveforms generated by at least one and often a plurality of nodes connected to the network by amplifying ringing of the waveforms and/or changing rise or fall time characterizing the waveform.

A NET-Sleuth, such as NET-Sleuth 40, in accordance with an embodiment of the disclosure, may be configured to recognize abrupt changes, by way of example an abrupt change in a CAN bus to which the NET-Sleuth is connected, and optionally alert a user to the occurrence of the change and recalibrate library fingerprints $L_j$.

In an embodiment, if NET-Sleuth 40 determines that that a plurality of frame waveforms generated by different nodes that it receives exhibit abrupt waveform changes, and/or that there is an increase in a number or frequency of waveforms that it cannot associate with a node, NET-Sleuth 40 may determine that an abrupt change, optionally of the CAN bus to which the nodes and the NET-Sleuth are connected, has occurred. In response, NET-Sleuth 40 may generate a new set of library fingerprints, optionally by executing algorithm 300, and optionally alert a user to the recognized change and action NET-Sleuth 40 has undertaken to generate a new set of library fingerprints.

In an embodiment, NET-Sleuth 40 is operable to serve as a node-j to generate and transmit a frame waveform, which may be referred to herein as a "selfie waveform". NET-Sleuth 40 is operable to receive the selfie waveform as a PW and generate a FPW for comparison with library fingerprints. NET-Sleuth 40 may compare the FPW with a library fingerprint (which may be referred to as a "selfie library fingerprint") store in a memory that characterizes NET-Sleuth 40 as a node-j, to determine if there is a difference between components of the fingerprint of the selfie waveform and the selfie library fingerprint, which indicates drift in the components of the library fingerprint.

In an embodiment, NET-Sleuth 40 periodically generates, transmits and receives a selfie waveform to monitor for a change, optionally an abrupt change, in a fingerprint of the selfie waveform, which may indicate a change in the CAN bus to which it is connected. In an embodiment, the NET-Sleuth periodically generates and transmits a selfie waveform to itself, and monitors the recurring selfie waveforms by comparing a fingerprint of the selfie waveform with a library fingerprint (a "selfie library fingerprint") characterizing the NET-Sleuth as a node. If a comparison between the fingerprint of the selfie waveform and the selfie library fingerprint results in a determination that the two fingerprints are different beyond a predetermined threshold, NET-Sleuth 40 initiates updating library fingerprints of at least a portion of the nodes, or optionally all of the nodes, which are represented in the library, and optionally alerts a user to the recognized change.

In an embodiment, NET-Sleuth 40 monitors for a change in the CAN bus by periodically transmitting CAN frames to nodes connected to the in-vehicle network that causes the respective nodes to respond and transmit a response frame waveform. If there is an abrupt change in a fingerprint of one or more response frame waveforms compared to their respective library fingerprints, NET-Sleuth 40 initiates updating library fingerprints of at least a portion of the nodes, or optionally all of the nodes, which are represented in the library, and optionally alerts a user to the recognized change.

In an embodiment, NET-Sleuth 40 is operable to initiate generating a new set of library fingerprints responsive to occurrences of particular events in the history of use of vehicle 30. For example, in an embodiment NET-Sleuth 40 may renew the library of library fingerprints $L_j$, in response to starting the vehicle engine, periodically at regular time intervals, each time the vehicle is serviced, and/or each time a node is replaced or a new node added or removed from in-vehicle network 60.

To initiate library renewal, NET-Sleuth 40 may transmit a CAN frame to each of a plurality of nodes connected to in-vehicle network that causes the node to respond and transmit a response frame waveform or a plurality of response frame waveforms. NET-Sleuth 40 may use the response waveform or waveforms to determine updated library fingerprints for the nodes that renew the library.

In an embodiment, NET-Sleuth 40 may be configured to destroy or block a waveform that NET-Sleuth 40 cannot associate with a node connected to in-vehicle network 60 or that NET-Sleuth 40 determines is otherwise anomalous. In an embodiment, to destroy and block a waveform, NET-Sleuth 40 may operate to transmit at least one dominant bit to replace at least one passive CRC bit encoded in the waveform. For example, NET-Sleuth 40 may transmit a dominant 0 to replace a passive 1 encoded in the CRC field of the waveform to destroy and block the waveform. By way of another example, NET-Sleuth 40 may transmit a CAN frame instructing a gateway, such as gateway 80, to block the waveform and/or any other similar waveforms from traversing the gateway. In an embodiment a gateway may comprise its own a NET-Sleuth and when the gateway determines that a waveform received by the gateway is anomalous, the gateway may automatically block the waveform from traversing the gateway.

FIG. 9 shows a schematic block diagram of NET-Sleuth 40 shown in FIGS. 1A and 1B, showing details of NET-Sleuth 40 and components that the NET-Sleuth may comprise in accordance with an embodiment of the disclosure.

NET-Sleuth 40 optionally comprises at least one port configured to connect NET-Sleuth 40 to the HV-wire and LV-wire of a CAN bus. In FIG. 9, as in FIG. 1B, NET-Sleuth 40 is shown having, optionally, one port 401 connected to HV and LV-wires 81 and 82 of bus 61. Port 401 is operable to receive analog frame waveforms propagating on bus 61 and input the received waveforms to NET-Sleuth 40, and optionally to output analog frame waveforms that might be generated by NET-Sleuth 40 onto bus 61. NET-Sleuth 40 optionally comprises a transceiver 403, a CAN controller 405, a processor 407 a memory 221 and a memory 222, and a wireless communications interface 430.

Transceiver 403 operates to sample analog differential voltage frame waveforms it receives from port 401 convert the samples from analog to digital (ADC) format, and forward the digital samples to controller 405 as digital differential voltage frame waveforms. Transceiver 403 is configured to sample the waveforms at operating sampling rates sufficient to determine rise and fall transition times of the waveforms and differentiate the waveforms with respect to time in regions of the transition times. Operating sampling rates of transceiver 403 are advantageously greater than about 35 MHz and are generally substantially greater than sampling rates of about 2 MHz that might conventionally be used to sample 1 MHz signals transmitted on high speed bus 61. The transceiver is, optionally, also configured, to receive CAN frame waveforms in digital format from controller 405 and convert the digital format to analog format (DAC) for transmission via port 401 on bus 61 as CAN differential voltage waveforms. Controller 405 is optionally configured to operate as a CODEC, an encoder and decoder. The controller may operate to decode digital differential voltage frame waveforms it receives from transceiver 403 into CAN frame bit streams and forward the bit streams, and the digital differential voltage frame waveforms that the controller decoded to generate the bit streams, to processor 407. The controller may also encode a CAN bit and/or CAN frame bit stream it receives from processor 407 into a digital waveform representing the bit and/or bit stream and transmit the digital waveform to transceiver 403 for conversion to an analog differential voltage waveform and transmission on bus 61 via port 401.

In an embodiment, processor 407 optionally comprises executable instructions that configure various modules that the processor may control by executing their respective instruction to support functionalities that the processor may provide. In an embodiment the modules may comprise a parser 408, detector 409, differentiator 410, fingerprinter 411, a comparator 412, and an authenticator 413. Upon receiving a CAN frame bit stream and digital differential voltage frame waveform from CAN controller 405, processor 407 may control parser 408, to delineate the various fields in the CAN frame bit stream and corresponding portions of the digital differential voltage frame waveform. Processor 407 may then execute instructions in detector 409 to locate desired regions of the waveform from a selection of the fields delineated by parser 408. In an embodiment, the processor controls detector 409 to locate voltage transitions between dominant and recessive bit voltages in portions of the digital differential voltage frame waveform in fields of the waveform exclusive of the ID field. Optionally, processor 407 controls detector 409 to identify voltage transitions in the data field of the waveform. Optionally, processor 407 then controls differentiator 410 to differentiate the digital differential voltage frame waveform in the regions of the transitions to generate a discrete sequence of derivatives of the waveform. The processor may then control fingerprinter 411 to generate a Fourier transform of the sequence and optionally a library fingerprint $L_j$, or a FPW fingerprint based on the Fourier transform, and/or a function of the Fourier transform, optionally in accordance with an algorithm 300 (FIG. 3) or with an algorithm 700 (FIG. 5).

It is noted that whereas in the above description NET-Sleuth 40 generates library $L_j$ and FPW fingerprints based on Fourier transforms of derivatives of waveforms in regions of voltage transitions, practice of embodiments of the disclosure is not limited to Fourier transforms or Fourier transforms of derivatives of waveforms. For example, a fingerprint of a waveform in accordance with an embodiment of the disclosure may be based on a Fourier transform of the complete waveform, a region of the waveform encoding a complete field of the waveform, and/or a portion of the waveform not substantially limited to transition regions. And a fingerprint of a waveform in accordance with an embodiment of the disclosure may be based on an integral transform other than a Fourier transform. A fingerprint in accordance with an embodiment of the disclosure may be based on moments of a frame waveform provided by a Laplace transform, or be based on a wavelet transform of the waveform.

A library fingerprint $L_j$ or a propagating waveform fingerprint FPW in accordance with an embodiment of the disclosure may also be generated without resource to an integral transformation. For example, a library fingerprint $L_j$ for waveforms generated by a node-j may comprise a feature vector based directly on physical characteristics of the waveform. Components of the library fingerprint may for example comprise values for such physical characteristics as rise times, fall times, pulse ringing, pulse width, and pulse shape, jitter, clock drift relative to clocks of other nodes, and/or values of projections of the characteristics on a suitable basis set of orthogonal, unit vectors generated by PCA.

In an embodiment, a library fingerprint characterizing a node-j or a propagating waveform fingerprint FPW is based on a concatenation of two or more different feature vectors characterizing a same waveform, generated by different processes as described herein applied to the waveform and/or from different sampled regions of the waveform as described herein. By way of example, a fingerprint in accordance with an embodiment of the disclosure is a concatenation of a first feature vector generated from waveform samples of rising voltage transitions and a second feature vector generated separately from waveform samples of falling voltage transitions in the same waveform.

If the fingerprint generated by processor 407 is a library fingerprint $L_j$, processor 407 may store the fingerprint in a fingerprint library stored in a memory 421. If the fingerprint is a FPW fingerprint processor 407 may control a comparator 412 to compare the FPW with library fingerprints $L_j$ stored in memory 21 to match the FPW and an $L_j$ and identify thereby a node that generated the frame waveform from which the digital differential voltage frame waveform was derived. Comparator may match the FPW with an $L_j$ as described above for example using scalar products $\langle FPW, L_j \rangle$ or a multivariate probability $\mathcal{P}$ ($FPW|L_j$).

If processor 407 succeeds in identifying a node that generated the frame waveform the processor may control an authenticator 413 to vet the digital waveform to determine if the waveform is a bonafide waveform of the identified node. Authenticator 413 may vet the waveform by determining if the waveform satisfies additional constraints, such as constraints discussed above. Optionally, NET-Sleuth 40 comprises a memory 422 having stored therein data and/or rules that the authenticator may access to authenticate the waveform.

In an embodiment, in the event that NET-Sleuth 40 determines that the FPW corresponds to an anomalous frame waveform, processor 407 may control CAN controller 405, and transceiver 403 to generate a dominant CAN bit and transmit the dominant bit via port 401 onto bus 61 to abort the frame waveform, as described above. Or where appropriate, as noted above, cause a gateway to prevent the waveform from traversing the gateway. In an embodiment, NET-Sleuth 40 may have a list of "ignore" CAN frames and corresponding ignore frame waveforms and NET-Sleuth 40 may be configured to check if a waveform that is determined to be anomalous is in the ignore list. And if the waveform is in the ignore list NET-Sleuth 40 operate to ignore the waveform and optionally undertake no action except, optionally, to log the occurrence of the ignore waveform into memory. An ignore waveform may by way of example, be a waveform corresponding to a diagnostic CAN frame typically transmitted during servicing of vehicle 30 via an on board diagnostic (OBD) port coupled to in-vehicle network 60.

Optionally, NET-Sleuth 40, stores an anomalous frame waveform and/or the waveform's CAN frame in memory 221 or 222, and may transmit the frame waveform, its CAN frame, and/or an alert to a network outside of in-vehicle network 60. The outside network may for example be a cloud based network an automotive manufacturer of vehicle 30 or a suitable authorized automotive maintenance enterprise.

It is noted that processor 407 and any one or combination of more than one of its components may comprise any electronic and/or optical processing and/or control circuitry, to provide and enable functionalities that NET-Sleuth 40 may require to support operation of the NET-Sleuth. By way of example, processor 407 may comprise any one, or any combination of more than one of, a microprocessor, an application specific circuit (ASIC), field programmable array (FPGA) and/or system on a chip (SOC). Memories 221 and 222 may comprise any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM). And whereas NET-Sleuth 40 is shown having two memories memory functions that NET-Sleuth 40 may require may be provided by a single memory or a plurality of memories greater than two.

It is further noted that whereas in FIGS. 1A, 1B, and FIG. 9, NET-Sleuth 40 is schematically shown as separate entity that appears to be hardware entity, a NET-Sleuth in accordance with an embodiment of the disclosure may be a "virtualized NET-Sleuth" defined by a software component or components comprised in a node of in-vehicle communication network 60. For example, gateway 80 may comprise computer executable instructions and data, or a combination of software and hardware that define a NET-Sleuth that provides NET-Sleuth functionalities in accordance with an embodiment of the disclosure that may be provided by NET-Sleuth 40. Or engine control ECU 62 (FIG. 1B) may comprise computer executable instructions and data that provide NET-Sleuth functionalities in accordance with an embodiment of the disclosure that may be provided by NET-Sleuth 40. A NET-Sleuth may also be integrated as a hardware component to the hardware of a gateway, such as gateway 80, or a node, such as telematics unit 78 of in-vehicle communication network 60, between a CAN transceiver and the CAN controller of the node.

There therefore provided in accordance with an embodiment of the disclosure a method of identifying a node of a plurality of nodes in an in-vehicle communications network that transmitted a waveform propagating in the network, the method comprising: receiving a plurality of analog voltage waveforms representing bit streams transmitted over the network by a plurality of J nodes comprised in an in-vehicle network; sampling each of the analog voltage waveforms to generate a discrete time sequence of samples for the waveform; processing each time sequence in accordance with an integral transform to generate a discrete transform sequence of a function of the sequence of samples, the transform sequence comprising a sequence of functions multiplied by respective amplitudes; providing a library of fingerprints comprising a unique library fingerprint for each node that comprises a feature vector in a vector space having components based on the amplitudes; receiving an analog voltage waveform propagating over the network; determining a fingerprint for the propagating waveform comprising a feature vector in the same vector space as the library vectors; comparing the fingerprint for the propagating voltage waveform with library fingerprints to determine which node transmitted the waveform.

Optionally providing a library fingerprint for a node comprises determining a first feature vector for each node unique to the node and having components based on the amplitudes of the transform sequence. Optionally the components based on the amplitudes are absolute values of the amplitudes. Additionally or alternatively the method comprises processing the first feature vectors for the nodes to provide a basis set of orthogonal unit vectors. Optionally, providing the unique library fingerprint for the node comprises determining a second feature vector expressing the first feature vector as a vector in a vector space spanned by the basis set of unit vectors.

In an embodiment of the disclosure processing each time sequence of samples to generate a discrete transform sequence of a function of the sequence of samples comprises generating a discrete time sequence of derivatives of the analog waveform based on the sequence of samples. Optionally generating a sequence of derivatives comprises determining derivatives for the waveform based on the sequence of samples in a region of the waveform exhibiting a voltage transition between voltages representing different bits in the bit stream. Sampling optionally comprises sampling at a sampling rate sufficient to determine a voltage rise time and/or fall time for the voltage transition.

In an embodiment of the disclosure providing a library of fingerprints comprises clustering feature vectors having components based on the amplitudes to provide clusters of the feature vectors and determining centroids of the clusters. Optionally comparing fingerprints comprises determining a scalar product between the fingerprint determined for the propagating analog waveform and a library fingerprint. The method may comprise determining a node that transmitted the waveform responsive to the scalar product.

In an embodiment of the disclosure comparing fingerprints comprises determining a multivariate Gaussian probability for the fingerprint determined for the propagating analog waveform and a library fingerprint. The method may comprise determining a node that transmitted the waveform responsive to the multivariate probability.

In an embodiment of the disclosure the integral transformation comprises a transform chosen from a group of transforms consisting of: a Fourier transform, Laplace transform, and wavelet transform. In an embodiment of the disclosure the analog voltage waveform is a differential voltage waveform. In an embodiment of the disclosure the in-vehicle communications network is a controller area network (CAN).

There is further provided in accordance with an embodiment of the disclosure a method for determining if an analog waveform transmitted over an in-vehicle communications network comprising a plurality of nodes is anomalous comprising: receiving an analog voltage waveform propagating over the network; processing the waveform in accordance a method of the disclosure to identify a node that transmitted the waveform; processing the waveform to determine if data that the waveform encodes is consistent with data that the identified node transmits under normal operation of the communications network; and determining that the waveform is anomalous if the data is inconsistent. The method may comprise blocking the waveform if the waveform is determined to be anomalous. Optionally, the in-vehicle communications network is a CAN network and blocking the waveform comprises transmitting a dominant bit on a bus of the network. Additionally or alternatively the in-vehicle network may comprise a gateway and blocking the waveform comprises preventing the waveform from traversing the gateway. Optionally the data comprised in the waveform comprises CAN ID data.

There is further provided in accordance with an embodiment of the disclosure a method of determining a fingerprint characterizing a node that generates frame waveforms in an in-vehicle communications network that, the method comprising: receiving an analog voltage waveform representing bit streams transmitted over the in-vehicle network by a node comprised in the in-vehicle network; sampling and analyzing the analog voltage waveform to generate a discrete time sequence of features for the waveform; detrending the time sequence of features of the waveform; processing the time sequence of features in accordance with an integral transform to generate a discrete transform sequence of a function of the sequence of features, the transform sequence comprising a sequence of functions multiplied by respective amplitudes; and providing a fingerprint of the node that comprises a feature vector having components based on the amplitudes. Optionally, the time sequence of features comprises one or a combination of two or more of: dominant voltage signals V(0); voltage signals during a rising voltage transition from V(1) to V(0); and voltage signals during a falling voltage transition from (V(0) to V(1). Optionally, the time sequence of features comprise one or more of: rise times of rising voltage transitions from V(1) to V(0) and fall times of falling voltage transitions from (V(0) to V(1). Optionally, the integral transformation comprises a transform chosen from a group of transforms consisting of: a Fourier transform, Laplace transform, and wavelet transform. Optionally, the analog voltage waveform is a differential voltage waveform. Optionally, the in-vehicle communications network is a controller area network (CAN).

In an embodiment, detrending the time sequence of features of the waveform comprises detrending relative to a time-dependent trend that the time sequence of feature exhibits. Optionally, the time dependent trend is a linear trend.

There is further provided in accordance with an embodiment of the disclosure a method of detecting a compromised node comprised in an in-vehicle communications network, the method comprising: receiving a plurality of analog voltage waveforms representing bit streams transmitted over the in-vehicle network; identifying a node ID encoded in an ID field comprised in each of the plurality of the analog voltage waveforms, respectively; determine a waveform fingerprint responsive to each of the analog voltage waveforms respectively, each waveform fingerprint comprising a feature vector characterizing the waveform; and comparing the plurality of waveform fingerprints with each other to determine a measure of similarity of the waveform fingerprints with each other.

In an embodiment, if waveform fingerprints from the plurality of waveform fingerprints characterized by being generated from waveforms sharing a same node ID fail to demonstrate a measure of similarity that meets a predetermined threshold, designate a node corresponding to the shared node ID as compromised.

In an embodiment, if waveform fingerprints from the plurality of waveform fingerprints characterized by being generated from waveforms having different node IDs demonstrate a measure of similarity beyond a predetermined threshold, designate a node or nodes corresponding to one or more of the different node IDs as compromised.

In an embodiment, the waveform fingerprint and the library fingerprints are determined by: sampling and analyzing the analog voltage waveform to generate a discrete time sequence of features for the waveform; processing the time sequence of features in accordance with an integral transform to generate a discrete transform sequence of a function of the time sequence of features, the transform sequence comprising a sequence of functions multiplied by respective amplitudes; providing a fingerprint of the waveform that comprises a feature vector having components based on the amplitudes. In an embodiment, the method comprises detrending the time sequence of features of the waveform.

There is further provided in accordance with an embodiment of the disclosure a method of detecting a compromised node comprised in an in-vehicle communications network, the method comprising: receiving a plurality of analog voltage waveforms representing bit streams transmitted over the in-vehicle network; identifying a node ID encoded in an ID field comprised in each of the plurality of analog voltage waveforms, respectively; determining a waveform fingerprint responsive to each of the analog voltage waveforms respectively, each waveform fingerprint comprising a feature vector characterizing the waveform; for each of the plurality of waveform fingerprints, compare the waveform fingerprint to each of a plurality of library fingerprints, each library fingerprint comprising a feature vector characterizing waveforms generated by one of a plurality of nodes comprised in the in-vehicle communications network, to identify a node whose library fingerprint matches the respective waveform fingerprint with a level of similarity that meets or exceeds a predetermined threshold; and if two or more waveforms having different node IDs encoded in the respective ID fields are characterized as having been generated by a same node with respect to the comparison the waveform fingerprints with the library fingerprints, designate at least one of the nodes corresponding to the different node IDs as being compromised.

In an embodiment, each of the waveform fingerprints and the library fingerprints are determined, respectively, by: sampling and analyzing an analog voltage waveform to generate a discrete time sequence of features for the waveform; processing the time sequence of features in accordance with an integral transform to generate a discrete transform sequence of a function of the sequence of features, the transform sequence comprising a sequence of functions multiplied by respective amplitudes; and providing a fingerprint of the waveform that comprises a feature vector having components based on the amplitudes. Optionally, the method comprises detrending the time sequence of features of the waveform.

There is further provided in accordance with an embodiment of the disclosure a method of detecting a change in a property of an in-vehicle communications network, the method comprising: receiving in a node a series of analog voltage waveforms representing bit streams generated by the node and transmitted periodically over the in-vehicle network; identifying a node ID encoded in an ID field comprised in each of the plurality of the analog voltage waveforms, respectively; for each waveform, determining a waveform fingerprint responsive to the respective waveform, each waveform fingerprint comprising a feature vector characterizing the waveform; comparing each waveform fingerprint to a library fingerprint comprising a feature vector characterizing waveforms generated by the node; and updating the library fingerprint if the comparison results in a determination that the waveform fingerprint and the library fingerprint are different beyond a predetermined threshold.

Optionally, the method comprises updating a plurality of library fingerprints characterizing one or more other nodes comprised in the in-vehicle network if the comparison results in a determination that the waveform fingerprint and the library fingerprint are different beyond a predetermined threshold.

In an embodiment, the waveform fingerprints and the library fingerprints are determined by: sampling and analyzing the analog voltage waveform to generate a discrete time sequence of features for the waveform; processing the time sequence of features in accordance with an integral transform to generate a discrete transform sequence of a function of the time sequence of features, the transform sequence comprising a sequence of functions multiplied by respective amplitudes; providing a fingerprint of the waveform that comprises a feature vector having components based on the amplitudes. Optionally, the method comprises detrending the time sequence of features of the waveform In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of determining a fingerprint characterizing a node that generates frame waveforms in an in-vehicle communications network, the method comprising: receiving a plurality of analog voltage waveforms representing bit streams transmitted over the in-vehicle network by a plurality of J nodes comprised in the in-vehicle network;

sampling and analyzing each of the analog voltage waveforms to generate a discrete time sequence of features for the waveform;

processing the discrete time sequence of features to generate a discrete time sequence of derivatives of the analog waveform;

processing the discrete time sequence of derivatives in accordance with an integral transform to generate a discrete transform sequence comprising a sequence of functions multiplied by respective amplitudes;

providing a fingerprint of the node—that comprises a feature vector having components based on the amplitudes.

2. The method according to claim 1, wherein the time sequence of features comprises one or a combination of two or more of: dominant voltage signals $V(0)$; voltage signals during a rising voltage transition from $V(1)$ to $V(0)$; or voltage signals during a falling voltage transition from $(V(0)$ to $V(1)$.

3. The method according to claim 1, wherein the time sequence of features comprise one or more of: rise times of rising voltage transitions from $V(1)$ to $V(0)$ or fall times of falling voltage transitions from $(V(0)$ to $V(1)$.

4. The method according to claim 1, and comprising detrending the time sequence of features of the waveform relative to a time-dependent trend that the time sequence of features exhibits.

5. The method according to claim 1, wherein the time dependent trend is a linear trend.

6. The method according to claim 1 wherein the integral transformation comprises a transform chosen from a group of transforms consisting of: a Fourier transform, Laplace transform, and wavelet transform.

7. The method according to claim 1 wherein the in-vehicle communications network is a controller area network (CAN).

* * * * *